US008880420B2

(12) United States Patent
Scotto

(10) Patent No.: US 8,880,420 B2
(45) Date of Patent: Nov. 4, 2014

(54) UTILITY FOR CREATING HEATMAPS FOR THE STUDY OF COMPETITIVE ADVANTAGE IN THE RESTAURANT MARKETPLACE

(75) Inventor: Stefano Alexander Scotto, Chicago, IL (US)

(73) Assignee: GrubHub, Inc., Chicago, IL (US)

( * ) Notice: Subject to any disclaimer, the term of this patent is extended or adjusted under 35 U.S.C. 154(b) by 237 days.

(21) Appl. No.: 13/467,723

(22) Filed: May 9, 2012

(65) Prior Publication Data

US 2013/0166348 A1    Jun. 27, 2013

Related U.S. Application Data

(63) Continuation-in-part of application No. 13/337,347, filed on Dec. 27, 2011, now Pat. No. 8,595,050.

(51) Int. Cl.
*G06Q 10/00* (2012.01)
*G06Q 30/00* (2012.01)

(52) U.S. Cl.
USPC ........................................................ 705/7.31

(58) Field of Classification Search
CPC ................................. G96Q 30/0605
USPC ............................... 705/7.11–7.42
See application file for complete search history.

(56) References Cited

U.S. PATENT DOCUMENTS

| 4,530,067 A | 7/1985 | Dorr |
| 4,547,851 A | 10/1985 | Kurland |
| 5,189,411 A | 2/1993 | Collar |
| 5,272,474 A | 12/1993 | Hilliard |
| 5,367,557 A | 11/1994 | Ozenbaugh |
| 5,510,979 A | 4/1996 | Moderi |
| 5,570,283 A | 10/1996 | Shoolery |
| 5,745,681 A | 4/1998 | Levine |
| 5,751,958 A | 5/1998 | Zweben |
| 5,774,670 A | 6/1998 | Montulli |
| 5,781,189 A | 7/1998 | Holleran |
| 5,835,896 A | 11/1998 | Fisher |
| 5,838,798 A | 11/1998 | Stevens |
| 5,839,115 A | 11/1998 | Coleman |
| 5,842,176 A | 11/1998 | Hunt |
| 5,845,263 A | 12/1998 | Camaisa |
| 5,850,214 A | 12/1998 | McNally |
| 5,912,743 A | 6/1999 | Kinebuchi |
| 5,948,040 A | 9/1999 | DeLorme |

(Continued)

FOREIGN PATENT DOCUMENTS

| EP | 0 844 579 A2 | 5/1998 |
| EP | 0 856 812 A2 | 5/1998 |

(Continued)

OTHER PUBLICATIONS

About Us, Compuwave Technologies Inc., Feb. 7, 2001.

(Continued)

*Primary Examiner* — Sujay Koneru
(74) *Attorney, Agent, or Firm* — The Law Offices of Konrad Sherinian, LLC

(57) ABSTRACT

A utility builds and displays heatmaps of competitive activity that aid in studying the competitive advantage of a particular restaurant. The heatmaps are constructed based on activity logged with a restaurant service, and available within the restaurant service's database(s).

10 Claims, 23 Drawing Sheets

(56) References Cited

U.S. PATENT DOCUMENTS

| | | | |
|---|---|---|---|
| 5,966,068 A | 10/1999 | Wicks | |
| 5,970,474 A | 10/1999 | LeRoy | |
| 5,991,739 A | 11/1999 | Cupps | |
| 6,134,548 A | 10/2000 | Gottsman | |
| 6,167,255 A | 12/2000 | Kennedy | |
| 6,175,922 B1 | 1/2001 | Wang | |
| 6,208,976 B1 | 3/2001 | Kinebuchi | |
| 6,236,974 B1 | 5/2001 | Kolawa | |
| 6,282,491 B1 | 8/2001 | Bochmann | |
| 6,295,541 B1 | 9/2001 | Bodnar | |
| 6,300,947 B1 | 10/2001 | Kanevsky | |
| 6,341,268 B2 | 1/2002 | Walker | |
| 6,356,543 B2 | 3/2002 | Hall | |
| 6,366,650 B1 | 4/2002 | Rhie | |
| 6,415,138 B2 | 7/2002 | Sirola | |
| 6,590,588 B2 | 7/2003 | Lincke | |
| 6,594,347 B1 | 7/2003 | Calder | |
| 6,836,537 B1 | 12/2004 | Zirngibl | |
| 6,873,693 B1 | 3/2005 | Langseth | |
| 6,973,437 B1 | 12/2005 | Olewicz | |
| 7,069,228 B1 | 6/2006 | Rose | |
| 7,216,152 B2 | 5/2007 | Short | |
| 7,277,717 B1 | 10/2007 | Hart | |
| 7,359,871 B1 | 4/2008 | Paasche | |
| 7,386,477 B2 | 6/2008 | Fano | |
| 7,437,305 B1 | 10/2008 | Kantarjiev | |
| 7,966,215 B1 | 6/2011 | Myers | |
| 8,073,723 B1 | 12/2011 | Bilibin et al. | |
| 8,326,705 B2 | 12/2012 | Niessen et al. | |
| 8,341,003 B1 | 12/2012 | Bilibin et al. | |
| 8,510,288 B2 * | 8/2013 | Mital et al. | 707/708 |
| 2001/0047301 A1 | 11/2001 | Walker | |
| 2002/0005430 A1 | 1/2002 | Pentel | |
| 2002/0046093 A1 | 4/2002 | Miller | |
| 2002/0107747 A1 | 8/2002 | Gerogianni | |
| 2002/0143655 A1 | 10/2002 | Elston | |
| 2002/0161604 A1 | 10/2002 | Kardos | |
| 2002/0178034 A1 | 11/2002 | Gardner | |
| 2005/0004843 A1 | 1/2005 | Heflin | |
| 2005/0049940 A1 | 3/2005 | Tengler | |
| 2006/0080176 A1 | 4/2006 | Sutcliffe | |
| 2007/0011061 A1 | 1/2007 | East | |
| 2007/0150375 A1 | 6/2007 | Yang | |
| 2007/0294129 A1 | 12/2007 | Froseth et al. | |
| 2008/0076451 A1 | 3/2008 | Sheha et al. | |
| 2008/0104059 A1 | 5/2008 | Segel | |
| 2009/0048890 A1 | 2/2009 | Burgh | |
| 2009/0106124 A1 | 4/2009 | Yang | |
| 2009/0150193 A1 | 6/2009 | Hong et al. | |
| 2009/0167553 A1 | 7/2009 | Hong et al. | |
| 2009/0204492 A1 | 8/2009 | Scifo et al. | |
| 2009/0307096 A1 | 12/2009 | Antonellis | |
| 2010/0070376 A1 | 3/2010 | Proud et al. | |
| 2010/0223551 A1 * | 9/2010 | Twig et al. | 715/712 |
| 2010/0268620 A1 | 10/2010 | Angert | |
| 2011/0040642 A1 | 2/2011 | O'Dell | |
| 2011/0161137 A1 * | 6/2011 | Ubalde et al. | 705/7.34 |
| 2011/0191194 A1 | 8/2011 | Lutnick et al. | |
| 2011/0208617 A1 | 8/2011 | Weiland | |
| 2011/0258011 A1 | 10/2011 | Burns | |
| 2012/0203619 A1 | 8/2012 | Lutnick et al. | |
| 2012/0290413 A1 | 11/2012 | Harman | |
| 2013/0038800 A1 | 2/2013 | Yoo | |
| 2013/0103605 A1 | 4/2013 | Villegas | |
| 2013/0144764 A1 | 6/2013 | Walling, III | |

FOREIGN PATENT DOCUMENTS

| | | |
|---|---|---|
| EP | 1 081 625 A2 | 7/2001 |
| JP | 62-050919 | 3/1987 |
| JP | 62-050919 A | 3/1987 |
| JP | 5-40767 | 2/1993 |
| JP | 5-40767 A | 2/1993 |
| JP | 6-52195 | 2/1994 |
| JP | 6-52195 A | 2/1994 |
| JP | 6-203051 | 7/1994 |
| JP | 6-203051 A | 7/1994 |
| JP | 9-160972 | 6/1997 |
| JP | 9-160972 A | 6/1997 |
| JP | 9-204466 | 8/1997 |
| JP | 9-204466 A | 8/1997 |
| JP | 9-296819 | 11/1997 |
| JP | 9-325988 | 12/1997 |
| JP | 9-330470 | 12/1997 |
| JP | 9-330470 A | 12/1997 |
| JP | 10-011194 | 1/1998 |
| JP | 10-011194 A | 1/1998 |
| JP | 10-224549 | 8/1998 |
| JP | 10-224549 A | 8/1998 |
| JP | 11-126147 | 5/1999 |
| JP | 11-126147 A | 5/1999 |
| JP | 11-191035 | 7/1999 |
| JP | 11-191035 A | 7/1999 |
| JP | 11-202974 | 7/1999 |
| JP | 11-202974 A | 7/1999 |
| WO | WO 95/34040 A1 | 12/1995 |
| WO | WO 97/08635 A1 | 3/1997 |
| WO | WO 98/35311 A1 | 8/1998 |
| WO | WO 99/17236 A1 | 4/1999 |

OTHER PUBLICATIONS

Wireless Products, Compuwave Technologies Inc., Feb. 7, 2001.
Micros Systems, Inc., POS Configurator User's Guide, 3700 POS, Micros Systems, Inc., 1998.
Micros Systems, Inc., New Products, Micros Systems, Inc., Nov. 11, 1996.
Rita Marie Emmer, Marketing Hotels: Using Global Distribution System, Cornell Hotel and Restaurant Administration Quarterly, 1993, 34; 80, DOI: 10.1177/001088049303400614.
T. Imielinski, Adaptive Wireless Information Systems, 1994.
IBM, POS Computer, 1998.
Krishna Bharat, Migratory Applications.
Andrew Fano, Shopper's Eye: Using Lcoation-based filtering for a shopping agent in the physical world, 1998.
Len Lewis, Opening the gates, Progressive Grover, Jul. 1998.
Arthur Keller, The Diana approach to mobile computing, CiteSeer, 1995.
A Chavez, A real-life experiment in creating an agent marketplace, PAAM, 1997.
Richard De Santa, Are you into your customers?, Supermarket Business, Jan. 1997.
Barron Housel, WebExpress: a system for optimizing web browsing in a wireless environment.
Carrie Lehman, Service connects restaurants, customers via orders by Internet, Alaska Journal of Commerce, Apr. 28, 1997.
Jennifer Rowley, Internet food retailing: the UK in context, ProQuest LLC, 1998.
John Soeder, Cyber Solicitation, Restaurant Hospitality, Sep. 1997.
Webpage, http://web.archive.org/web/201 012041 00846/http://www.grubhub.com/, GrubHub, Inc., Oct. 29, 2010.
Wireless Restaurant System, Compuwave Technologies Inc., Feb. 7, 2001.
Kevin Crowston, Understanding Processes in Organizations, Jul. 1998.
Engaging Customers Across All Touch Points: A Roadmap for Leading Retailers, Blue Martini Software, Inc., www.bluemartini.com.
Chuck Andraka, Put your database on the Web, Data Based Advisor, v14, n6, p12, Jun. 1996.
Steven Vaughan-Nichols, Unleashing Databases on the Web—True wealth and power belong to those who control information access, Netguide, 1996, n307, p. 111.
P.L. Olympia, Cold Fusion 1.5; Autobahn, DBMS, v9, n8, p. 33, Jul. 1996.
Eshop.com, eShop Technology, eshop.com, Jan. 1, 1996.
Eshop.com, eShip Technology Merchant Manual, eShop.com, Feb. 21, 1996.

(56) References Cited

OTHER PUBLICATIONS

Kambe Tomonari, Screen design simulator "U-face", Information Processing Society of Japan (IPSJ) The 39th National convention colleciton of papers, 1457-1458, Oct. 16, 1989.
Kato Kiyosh, A Prototype of a User Interface Software for Portable Terminal with a Small Display Screen, Information Processing Society of Japan (IPSJ) The 53rd National co . . . .
Squirrel Systems, May 8, 1999, http://web.archive.org/web/19990508153731/www.squirrelsystems.com/about/company.
Robin Berger, POS Positions Spago for Growth, Squirrel Systems, Apr./May 1997.
Squirrel Systems, POS System, May 8, 1999, http://web.archive.org/web/19990508175824/www.squirrelsystems.com/products/newsq . . . .
Squirrel Systems, Squirrel Restaurant Management System.
Squirrel Systems, Press Releases, Squirrel Systems, Aug. 20, 1998.
Business Editors, Fujitsu and Sulcus Hospitality Group partner to develop first wireless computer for restaurant industry, Business Wire, Aug. 30, 1993.
Sulcus's Squirrel and cybermeals Ink Technology Alliance, Business Wire, Feb. 24, 1998.
Accel Partners Invest $10 Million incybermeals, Business Wire, May 28, 1998.
Rev Share Information, Cybermeals, Jan. 24, 1998.
Squirrel point-of-sale software, Squirrel Systems, Oct. 10, 1999.
Chapter 4—Wireless Data, Wireless Technologies and the National Information Infrastructure, Diane Pub Co, Oct. 1995.
Brew Moon Management Toasts Squirrel's "Seamless Solution", Squirrel Systems, Nov. 1998.
Squirrel Systems, Squirrel® Customer Profile: Chevys Fresh Mex®, Squirrel Systems—Restaurant Management, Aug. 1998.
Micro Systems, Inc., Appendix, User's Manual, 8700 HMS Version 2.10, micros Systems, Inc., 1995-1997.
Micro Systems, Inc., Chapter 1-11, User's Manual, 8700 HMS Version 2.10, micros Systems, Inc., 1995-1997.
Micro Systems, Inc., Full Service Operations, Micros 3700 Point-of-Sale System, Micro Systems, Inc., Nov. 11, 1996.
Micro Systems, Inc., New Products, Micros 3700 Point-of-Sale System, Micro Systems, Inc., Nov. 11, 1996.
Micro Systems, Inc., Quick Service Operations, Micro Systems, Inc., Nov. 11, 1996.
Micro Systems, Inc., All About Us, Micro Systems, Inc., Nov. 11, 1996.
Micro Systems, Inc., Full Service Operations, Micro Systems, Inc., Nov. 11, 1996.
Micro Systems, Inc., 8700 HMS Product Overview, Micro Systems, Inc., 2000.
Micro Systems, Inc., Micros Hand-Held TouchScreen, Micro Systems, Inc., Sep. 1992.
Micro Systems, Inc., The Micro 2700 HMS Touchscreen, Micro Systems, Inc.
RMS Touch, RMS-Touch—Touch Screen Restaurant Management System Product Description, RMSTouch.com, Feb. 15, 1997.
RMS Touch, Company Profile RMS, Touch.com, Integrated Restaurant Software, Feb. 15, 1997.
Elite32 Restaurant System, Compuwave Technologies Inc., 2000.
POS Infrared Restaurant System, Compuwave Technologies Inc., 2000.
Wireless POS Drive-Through System, Compuwave Technologies Inc., 2000.
Compuware Technologies Approved as Supplier to McDonald's Canda, Compuwave Technologies Inc., Sep. 14, 2000.
U.S. Appl. No. 60/131,119, filed Apr. 27, 1999, Robert Showghi.
U.S. Appl. No. 60/083,651, filed Apr. 30, 1998, Theodore Chen.

\* cited by examiner

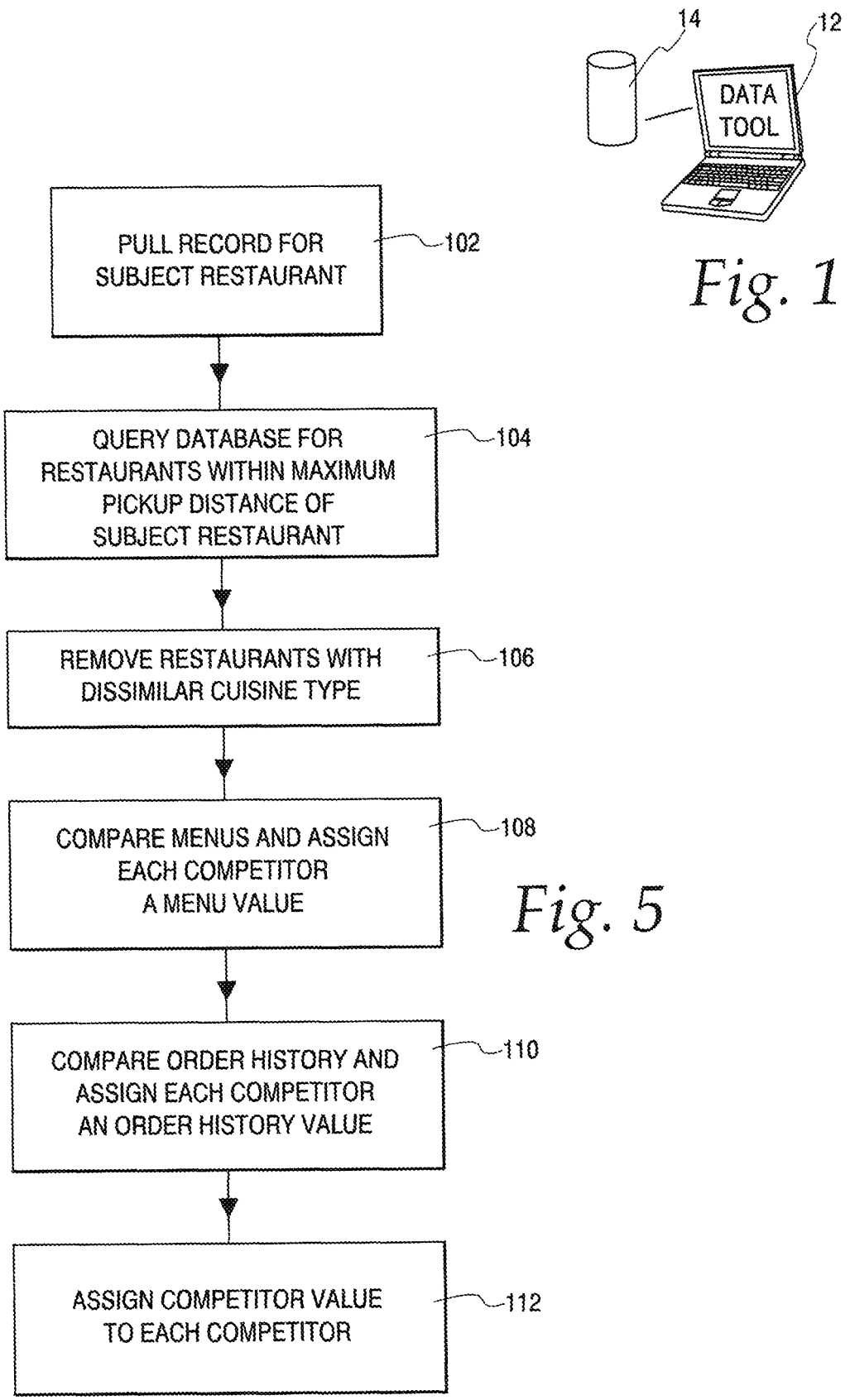

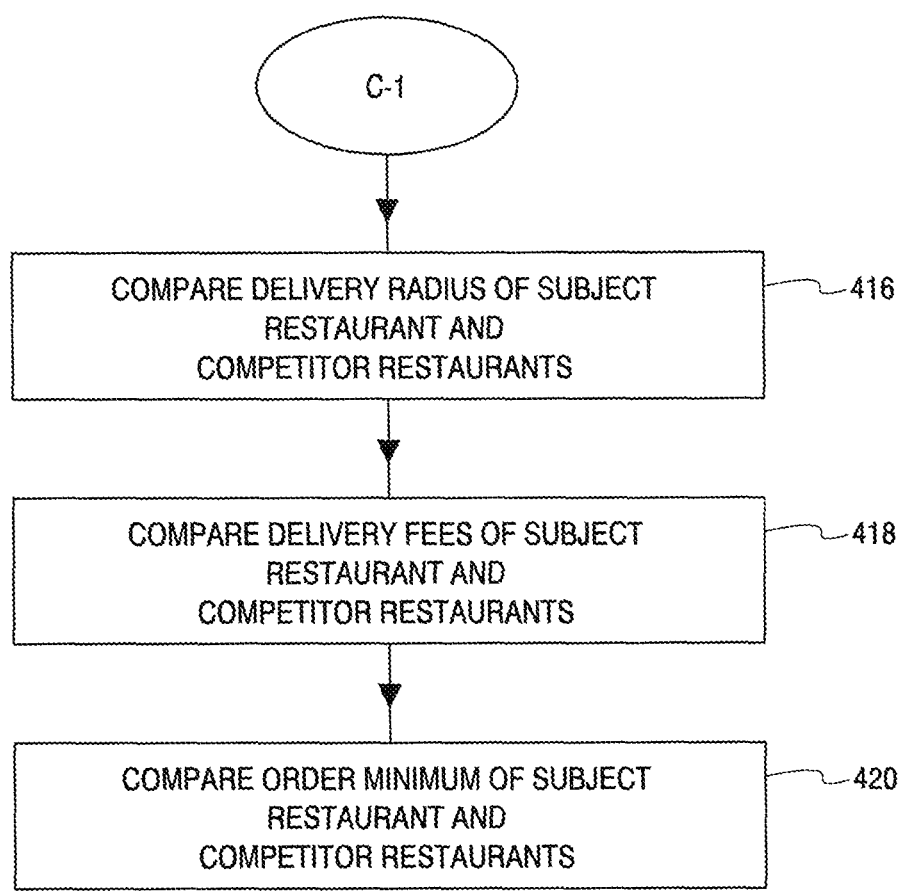

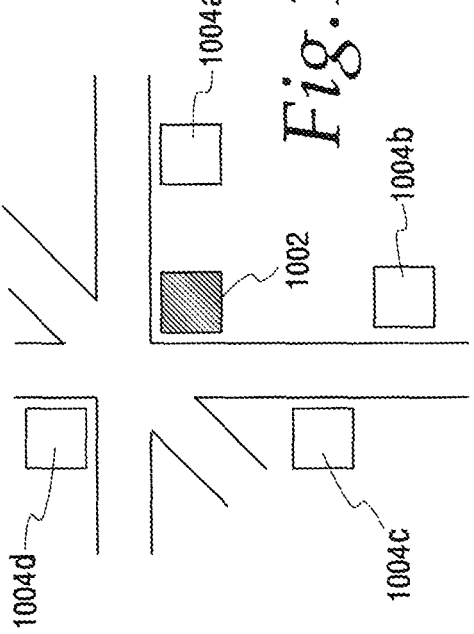
*Fig.18a*
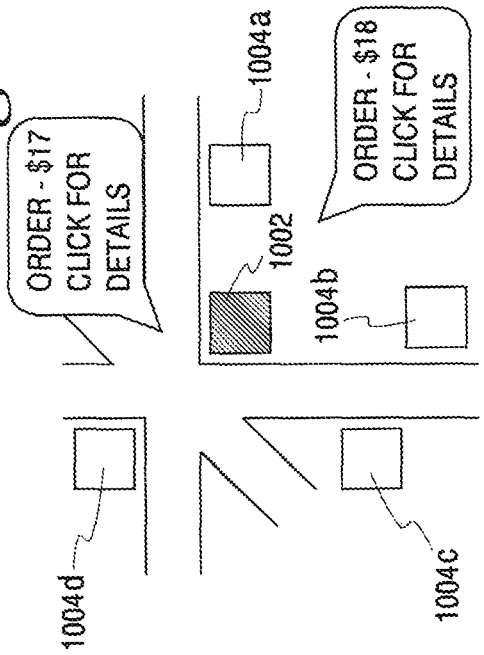
*Fig.18c*
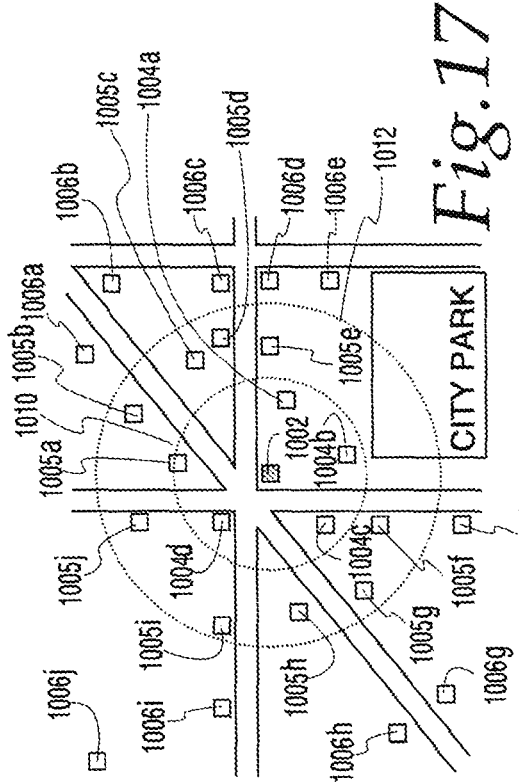
*Fig.17*
*Fig.18b*

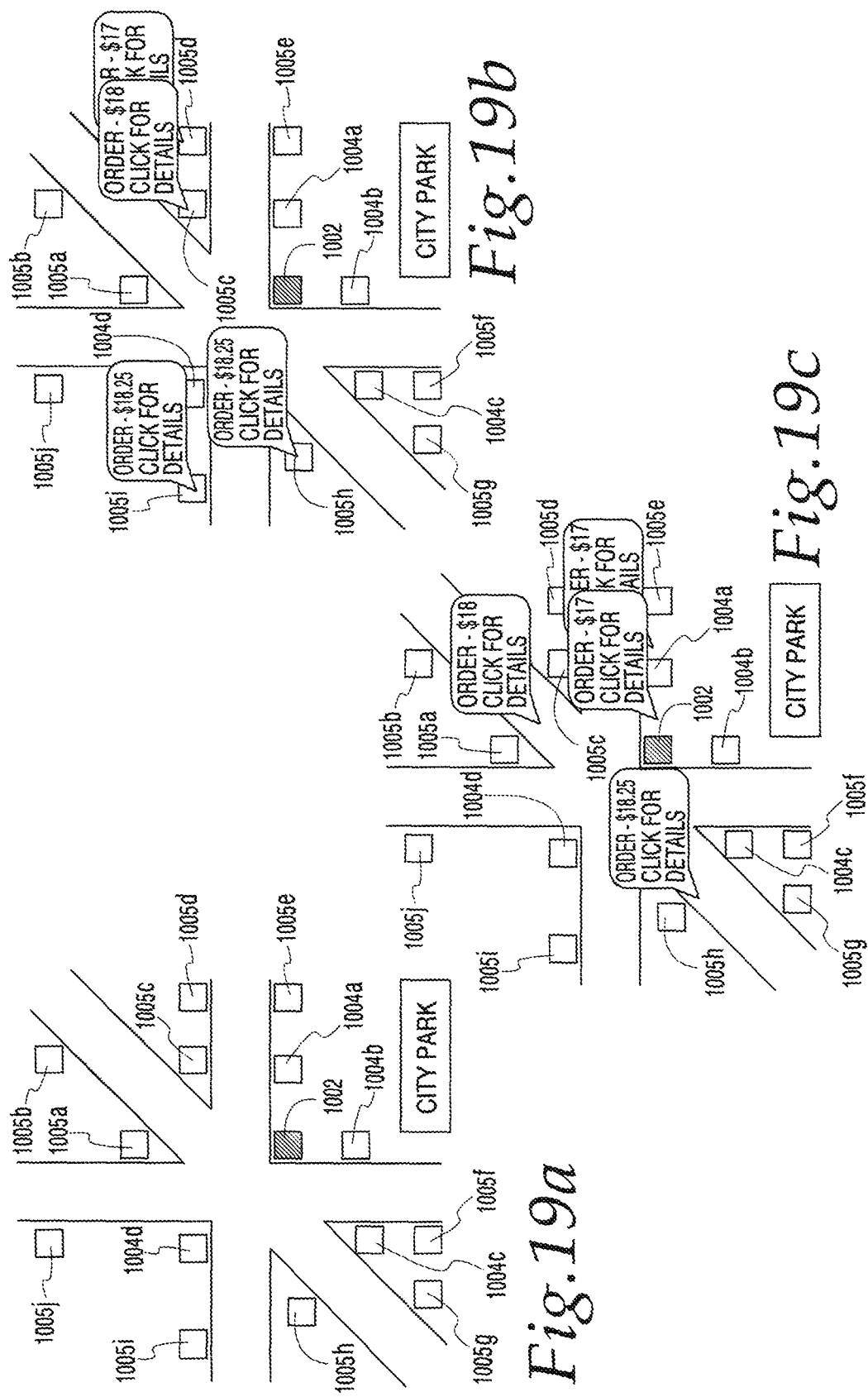

DIFFERENT WAYS TO DENOTE LOW AND
HIGH LEVELS OF COMPETITIVE ACTIVITY

UTILITY FOR CREATING HEATMAPS FOR THE STUDY OF COMPETITIVE ADVANTAGE IN THE RESTAURANT MARKETPLACE

CROSS REFERENCE TO RELATED APPLICATIONS

This application claims priority under 35 U.S.C. §120 as a continuation-in-part of U.S. patent application Ser. No. 13/337,347, titled "UTILITY FOR DETERMINING COMPETITIVE RESTAURANTS," filed on Dec. 27, 2011 now U.S. Pat. No. 8,595,050, which is hereby incorporated by reference in its entirety.

FIELD OF THE INVENTION

The present invention relates to a system and method of studying the competitive advantage of a retail business and its competitors, and more particularly relates to a system and method for creating maps of retail activity for a retail business and its competitors, and more particularly still, for creating maps of pickup and delivery diner activity for a restaurant and its competitors using a database assembled by a restaurant service of which the restaurant and its competitors are members.

DESCRIPTION OF THE PRIOR ART businesses naturally desire to know who their most important competitors are. Generally, any two businesses that market to the same customers are in competition. For example, a suburban convenience store is, in the broadest sense, in competition with a nearby grocery store, as dollars spent by customers in the grocery store cannot be spent in the convenience store. However, experience shows that a gas station located a mile away and offering basic convenience items is a far more important competitor to the convenience store than the grocery store across the street, as customers will look to the gas station for the same types of purchases that they look to the convenience store; i.e., impulse purchases or purchases that must be executed quickly.

Within the restaurant field, the situation becomes complex very quickly. There are numerous cuisine types, such as Asian and French, and within each cuisine type, there are often multiple levels of dining experience. For example, within Asian restaurants, there are fast-food Asian restaurants, as well as fine-dining Asian restaurants, and multiple levels in between. Cuisine types can be subdivided even further; for example, there are Chinese, Japanese, Thai, and Vietnamese restaurants, all of which are "Asian Restaurants," and all of which offer very different types of food from one another, and are likely to attract diners with very different tastes.

To further complicate matters, within the restaurant field, restaurants offering very different types of food can be considered competitors under certain circumstances. For example, an urban Mexican restaurant primarily serving the lunch crowd is likely in direct competition with nearby sandwich restaurants, pizza restaurants, and Asian restaurants serving the same crowd.

One way that restaurants determine their closest competitors is to consult market surveys. For example, a restaurant may setup an online page that, in exchange for access to coupons or other "bonuses," gathers information about customers' dining habits by asking diners to answer surveys. Another way that this can be accomplished would be by placing a tracking cookie on a user's computer and checking the cookie each time a customer visits the restaurant's web page for the identity of other restaurant's web pages. Other, similar techniques have been employed in the past.

There are a number of problems with such "market survey" approaches. One problem is that the significance of market surveys is difficult to quantify. For example, the relevance of a restaurant's customer visiting the website of a competitor is questionable. Another issue with such surveys is that they are expensive and time consuming to conduct.

Another problem facing businesses is that once a particular competitor is identified, it is difficult to understand in what areas the competitor excels, and in what areas the competitor is vulnerable. Similarly, many businesses do not understand their own strengths and weaknesses when compared to their most important competitors. These inquiries are critical to the development of competitive advantage. Returning to the restaurant field, a particular competitor may excel at serving light meals to the lunch crowd, while not having an appropriate selection of more filling meals for lunch patrons. The same restaurant may have entirely different competitive strengths with regards to dinner and breakfast patrons, or it may not serve them at all. Based on these kinds of assessments, a restaurant that excels at providing hearty meals to the lunch crowd could appropriately position itself against its light-lunch serving competitor.

Most restaurants do not make any formal study of other restaurants competitive advantage. For those that do, the usual way for a restaurant to obtain a better understanding of the competitive advantage of competing restaurants is through a study of reviews conducted by critics, surveys conducted with the restaurant's own customers, and actual investigation of the restaurant's offerings through visits to the competing restaurant. This method of market research, while well understood, leaves much to be desired. In particular, it is extremely time consuming, and the actual determination of a competitor's strengths and weaknesses is highly subjective.

Certain businesses have made use of maps that play back purchases by consumers at their establishment. For example, online retailer Zappos.com makes a map of recent purchases available. This map displays some or all online orders that are placed, along with an indication of where the purchase was placed from. For example, if a customer in Raleigh, N.C. purchases a set of shoes, a brief descript of the shoes along with an abbreviated version of the purchasers name, such as M. S. (for Mary Smith), is displayed in a small "bubble" for a brief period of time, with the tail of the bubble tracing back to the purchasers approximate location. In addition, restaurant service provider GrubHub, Inc. operates a map that resides in the lobby of their Chicago headquarters as well as the lobby of their New York office that displays orders in near real-time in certain markets. These displays provide strong visual clues as to where ordering activity is taking place at any given time.

OBJECTS OF THE DISCLOSED COMPETITIVE ADVANTAGE UTILITY

An object of the disclosed competitive advantage utility is to provide an automated means of studying the competitive advantage of specifically identified competitors for a business;

Another object of the disclosed competitive advantage utility is to provide an automated means of studying the competitive advantage of all competitors, or an identified subset of competitors, within a particular distance of a subject business;

Another object of the disclosed competitive advantage utility is to graphically depict activity of all competitors or an identified subset of competitors;

Another object of the disclosed competitive advantage utility is to graphically depict the activity of competitive restaurants within a particular distance of a subject business;

Another object of the disclosed competitive advantage utility is to graphically depict the activity of competitive restaurants within a specified time period;

Other advantages of the disclosed shopping service will be clear to a person of ordinary skill in the art. It should be understood, however, that a system, method, or apparatus could practice the disclosed competitor utility while not achieving all of the enumerated advantages, and that the protected shopping service is defined by the claims.

SUMMARY OF THE INVENTION

A utility for studying the competitive advantage of a particular restaurant displays a heatmap of competitive activity. In particular, a database maintains an order queue. A restaurant server with access to the database communicates with a computer system over a network, such as, for example, the Internet. The computer system transmits an identifier to the restaurant server that uniquely identifies it. The computer system also transmits an indicia indicative of desired competitor characteristics to the restaurant server. The restaurant server queries the database based on the indicia and the identifier to determine a set of competitors for the subject restaurant. The restaurant server then compiles a list of competitors and transmits them to the computer system, which specifies a map area that includes the subject restaurant and transmits the map area to the restaurant server. The restaurant server queries the database for competitor activity within the map area and generates competitive activity events that are transmitted to the computer system. The computer system renders the competitive activity events on a display.

BRIEF DESCRIPTION OF THE DRAWINGS

Although the characteristic features of this invention will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

FIG. 1 is a simple system diagram of a system implementing the disclosed competitor utility;

FIG. 5 is a flowchart illustrating a second process by which a utility can programmatically determine the competitors of a subject restaurant;

FIGS. 9a and 9b comprise a flowchart illustrating a fourth process by which a utility can programmatically determine the competitors of a subject restaurant;

FIG. 17 is a displaying a tool for selecting a map area for which to display a heat map for;

FIGS. 18a-c are a set of heat maps for a small area about a subject restaurant;

FIGS. 19a-c are a set of heat maps for a larger area about a subject restaurant;

DETAILED DESCRIPTION OF THE ILLUSTRATED EMBODIMENT

I. Utility for Determining Competitors of a Business

Turning to the Figures, and to FIG. 1 in particular, a system implementing the disclosed competitor locator utility is depicted. In particular, the system comprises a computer 12, which could be, for example, a personal computer or a smart phone, with access to a database 14. The computer 12 executes software, referred to as the competitor utility. The database contains records of restaurants, including the restaurants' names, location, a general description of the type of cuisine offered by each restaurant, a detailed menu comprising the items offered for sale and their prices, and an order history for each restaurant. Such a database may be compiled by, for example, a market research company covering the restaurant business, or a restaurant service, providing delivery and/or order placement services for a large number of restaurants, or any other entity having an interest in restaurants.

Figure 2A:
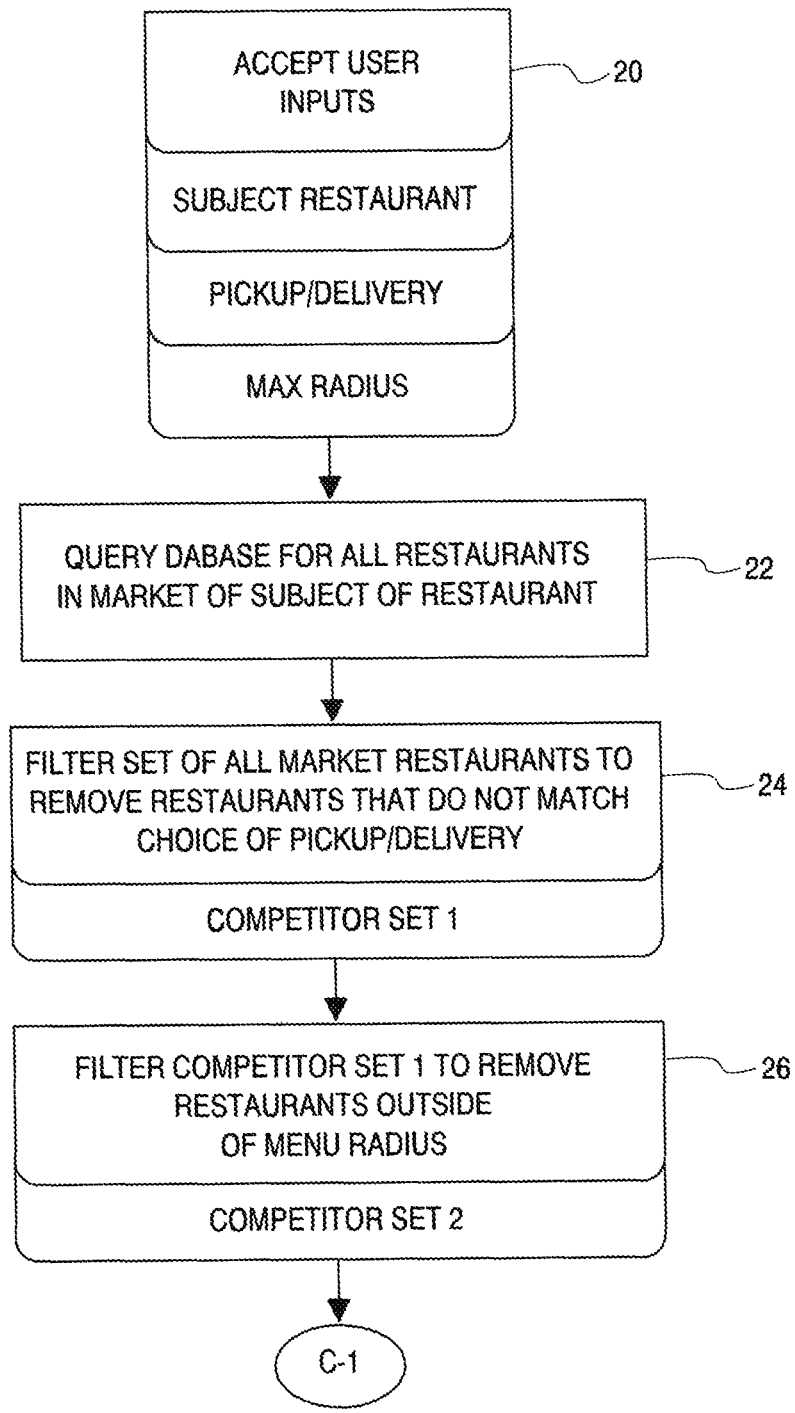
FIGS. 2a and 2b are a flowchart illustrating a first process by which a utility can programmatically determine the competitors of a subject restaurant.
Figure 2B:
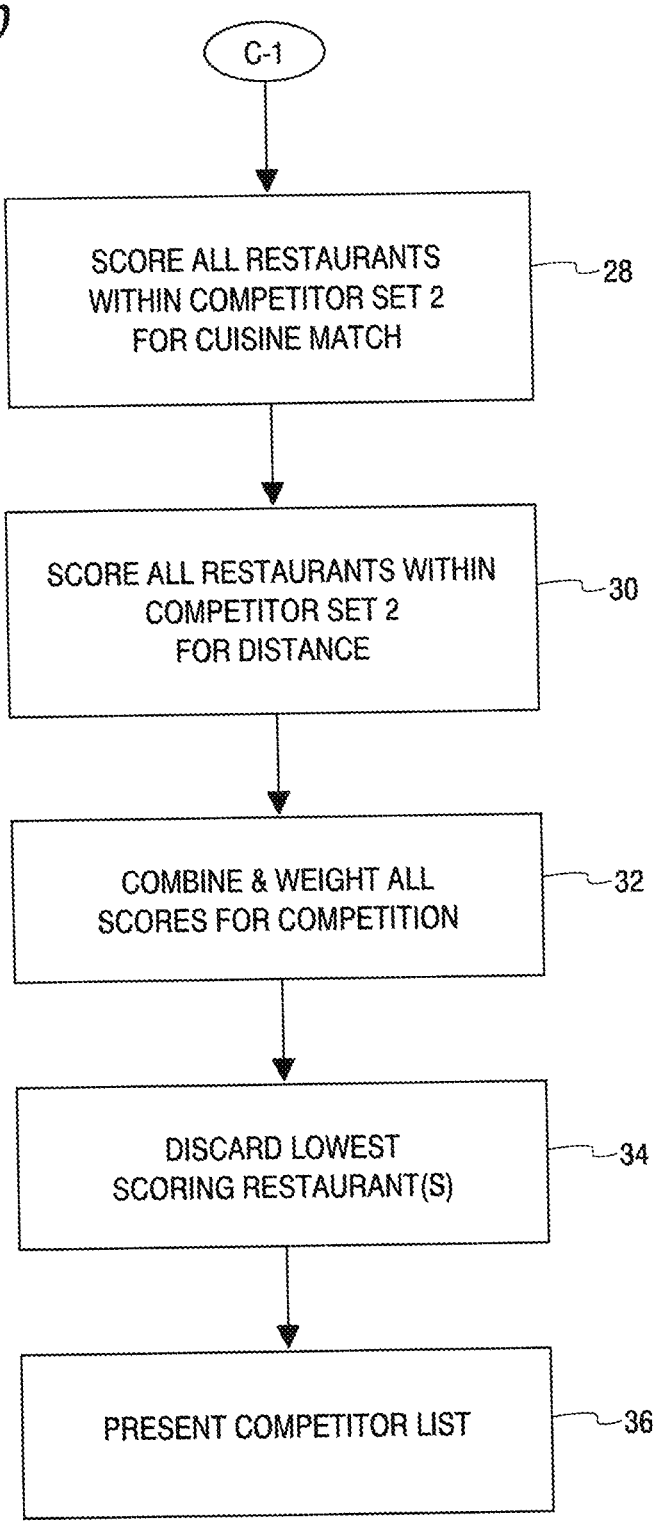

FIGS. 2a and 2b comprise a flow chart depicting a first process by which software with access to database 14 can assemble a list of the most important competitors to a subject restaurant. In a first step 20, a number of user inputs are accepted, including identifying the subject restaurant, specifying whether restaurants providing their service through pickup, delivery, either pickup or delivery, or both pickup and delivery are to be included in the search, and a maximum radius to search in. In step 22, the utility queries database 14 for all restaurants within the market of the subject restaurant; e.g., for a restaurant in Chicago, Ill., all restaurants within the Chicago area will be returned, as all of them are potentially competitors of the subject restaurant.

Execution then transitions to step 24, where the first of two filters are applied. The first filter removes all restaurants that do not provide the chosen pickup or delivery service, and assembles competitor set 1. For example, if delivery were chosen above, all restaurants that provide only pickup service would be filtered out of competitor set 1. Execution then transitions to step 26, where all restaurants outside of the specified maximum radius are filtered out. Allowing a user to specify a maximum radius allows the user to apply judgment regarding the specific situation facing the subject restaurant. For example, a downtown restaurant may use a much smaller maximum radius than a restaurant within a residential neighborhood.

After assembling competitor set 2, the utility then generates a cuisine match score for each restaurant within competitor set 2 in step 28. The details of how a cuisine match score can be generated are discussed below with regard to FIG. 3. Execution then transitions to step 30, where a distance score is generated for reach restaurant within competitor set 2, as further discussed below with regards to FIG. 4.

The scores generated in steps 28 and 30 are then weighted and combined to form a competitor score for each restaurant within competitor set 2. The scores can be combined with any desired weighting; for example, the cuisine score can be weighted by a factor of 0.8, while the distance score can be weighted by a factor of 0.2. In step 34, the lowest scoring competitors are discarded, so that only the most relevant competitors are displayed. There are a number of ways that competitors can be trimmed from the list; for example, the lowest scoring restaurant can be removed, or a percentage, such as 30%, of the lowest scoring restaurants can be removed. Finally, in step 36, the competitor restaurants are presented by the utility.

Figure 3:
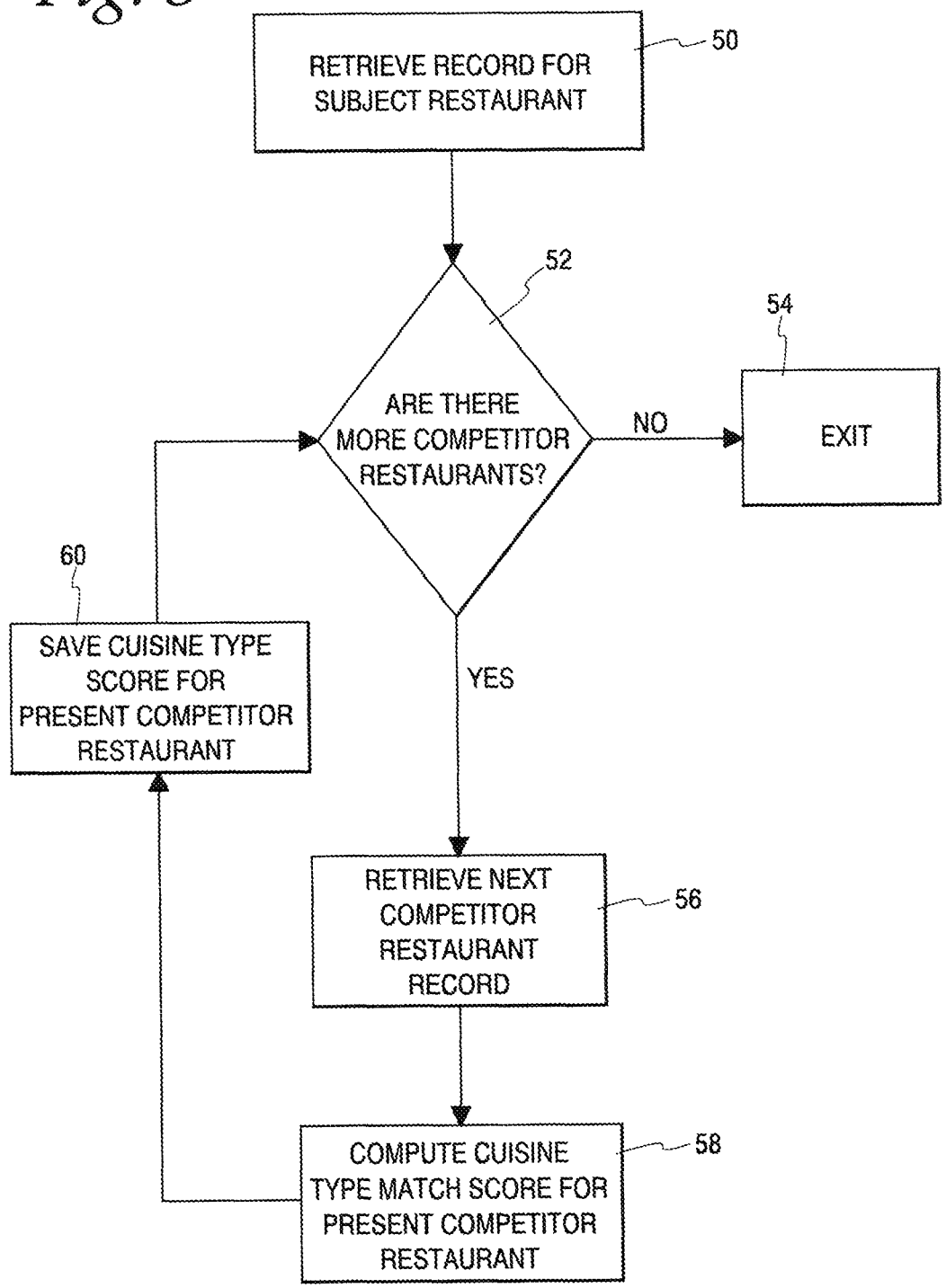
FIG. 3 is a flowchart illustrating a process by which a cuisine type match score between a subject restaurant and a competitor restaurant can be calculated.

FIG. 3 is a flow chart that illustrates the process by which a cuisine type match score can be computed. In step 50, the database record for the subject restaurant is retrieved from the database. In step 52, a check is made to determine if there are more competitor restaurants in competitor set 2 to compute cuisine type match scores for. If there are not, the process exits in step 54. However, if there are more competitor restaurants in competitor set 2, execution transitions to step 56, where the next competitor restaurant in competitor set 2 is retrieved. In step 58, the cuisine type match score for the present competitor restaurant is computed, and in step 60, the cuisine type match score for the present competitor is saved for future use. Execution then returns to step 52.

One way that the cuisine type match score could be computed would be to compute the number of matching cuisine types between the present competitor restaurant and the subject restaurant, and then dividing the number of matches by the total number of cuisine types of the subject restaurant. Cuisine type is a broad indication of the type of food that a restaurant serves, and many restaurants will cover multiple cuisine types. A non-exhaustive list of example cuisine types are: African, Argentinian, barbecue, bagels, bakery, Brazilian, Cajun, Cantonese, Caribbean, Chicken, classic, Colombian, Cuban, deli, dessert, Dim Sum, eclectic, Ecuadorian, fine dining, French, fresh fruits, German, Greek, grill, hoagies, ice cream, Indian, Irish, Jamaican, Japanese, kids menu, Korean, Kosher, late night, Latin American, Lebanese, low carb, low fat, Malaysian, Mandarin, Mediterranean, Mexican, Middle Eastern, noodles, organic, Persian, Peruvian, Polish, Portuguese, Puerto Rican, ribs, Russian, seafood, soul food, soup, South American, Spanish, steak, subs, sushi, Szechwan, tapas, Thai, Turkish, vegan, vegetarian, Vietnamese, wings, and wraps.

Accordingly, if the subject restaurant has cuisine types of Brazilian, fine dining, grill, late night, low carb, and South American, and a competitor restaurant has cuisine types of classic, Cuban, fine dining, and Latin American, there would be matches on only 1 cuisine type out of 6. If another competitor restaurant has cuisine types of Brazilian, fine dining, South American, and wraps, there would by matches on 3 cuisine types out of 6. Accordingly, the first competitor restaurant would have a cuisine type match score of ⅙, while the second restaurant would have a cuisine type match score of ½ (3/6).

Figure 4:
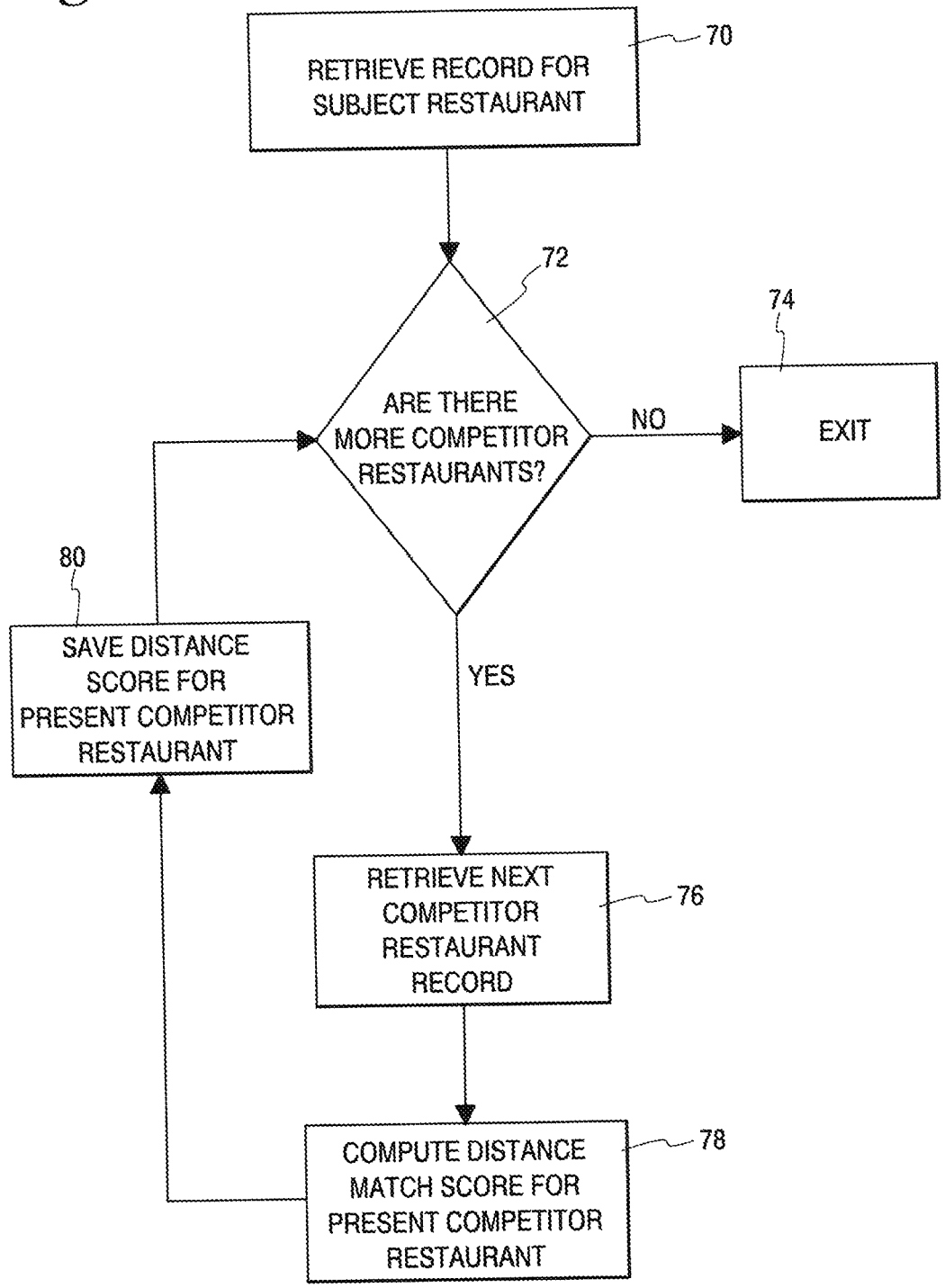
FIG. 4 is a flowchart illustrating a process by which a distance score can be calculated between a subject restaurant and a competitor restaurant can be calculated.

FIG. 4 is a flowchart that illustrates the process by which a distance score can be computed for competitor restaurants. In step 70, the record of the subject restaurant is retrieved. Execution then transitions to step 72, where a check is made to determine if there are more competitor restaurants. If not, execution transitions to step 74 where the process is exited. If there are additional competitor restaurants, execution transitions to step 76, where the next competitor restaurant record is retrieved. In step 78, a distance score for the present competitor restaurant is computed, and in step 80, the distance score for the present competitor restaurant is stored for later use.

One way that a distance score for a competitor restaurant can be computed is through the use of the Gaussian function, which assumes that the preference of consumers regarding the distance to a restaurant which they are willing to patronize is normally distributed. The Gaussian formula can be expressed as:

$$f(x) = ae^{-\frac{(x-b)^2}{2c^2}}$$

Where e is Euler's number (approximately 2.718281828), a is a constant that sets the high of the distributions peak, b is the center value of the peak, and c controls the width of the resultant distribution. Accordingly, for a distribution centered at 0 (meaning that most consumers will prefer restaurants closer to them) with a maximum peak of 1.0, and an approximate width of 2.0 miles, the following equation results.

$$f(x)e^{-\frac{(x)^2}{2 \times 2^2}}$$

Accordingly, for a competitor restaurant that is 2 miles away from the subject restaurant would have a score of approximately 0.60653.

In FIG. 5, a flow chart depicting a second process by which software with access to database 14 can assemble a list of most important competitors for a subject restaurant. In a first step 102, a record corresponding to the subject restaurant is retrieved from the database 14. In the next step 104, a database query is made to determine those restaurants within a maximum pickup distance of the subject restaurant. Then, those restaurants that have a different basic cuisine type are stripped out in step 106; i.e., if the subject restaurant primarily serves pizza, then Asian restaurants, French Restaurants, Fine Dining Restaurants, etc., will be stripped out, as they are not truly "competitors" of the subject restaurant.

In step 108, the menus of the remaining competitor restaurants are compared with the menu of the subject restaurant. Similarly, in step 110, the order histories of the remaining competitor restaurants are compared with the order history of the subject restaurant. Based on the comparisons in step 108 and step 110, a list of most important competitors is assembled and output in step 112. Generally, a competitor value is assigned to each competitor in step 112, which is a combination of the menu value derived in step 108 and the order history order history value derived in step 110, both of which are addressed in more detail hereafter. It should be noted that the different values can be combined in a weighted fashion; for example, the menu value may receive a weight of 2, while the order history value receives a weight of 1, and the competitor score will be the addition of the two weighted scores.

Figure 6:
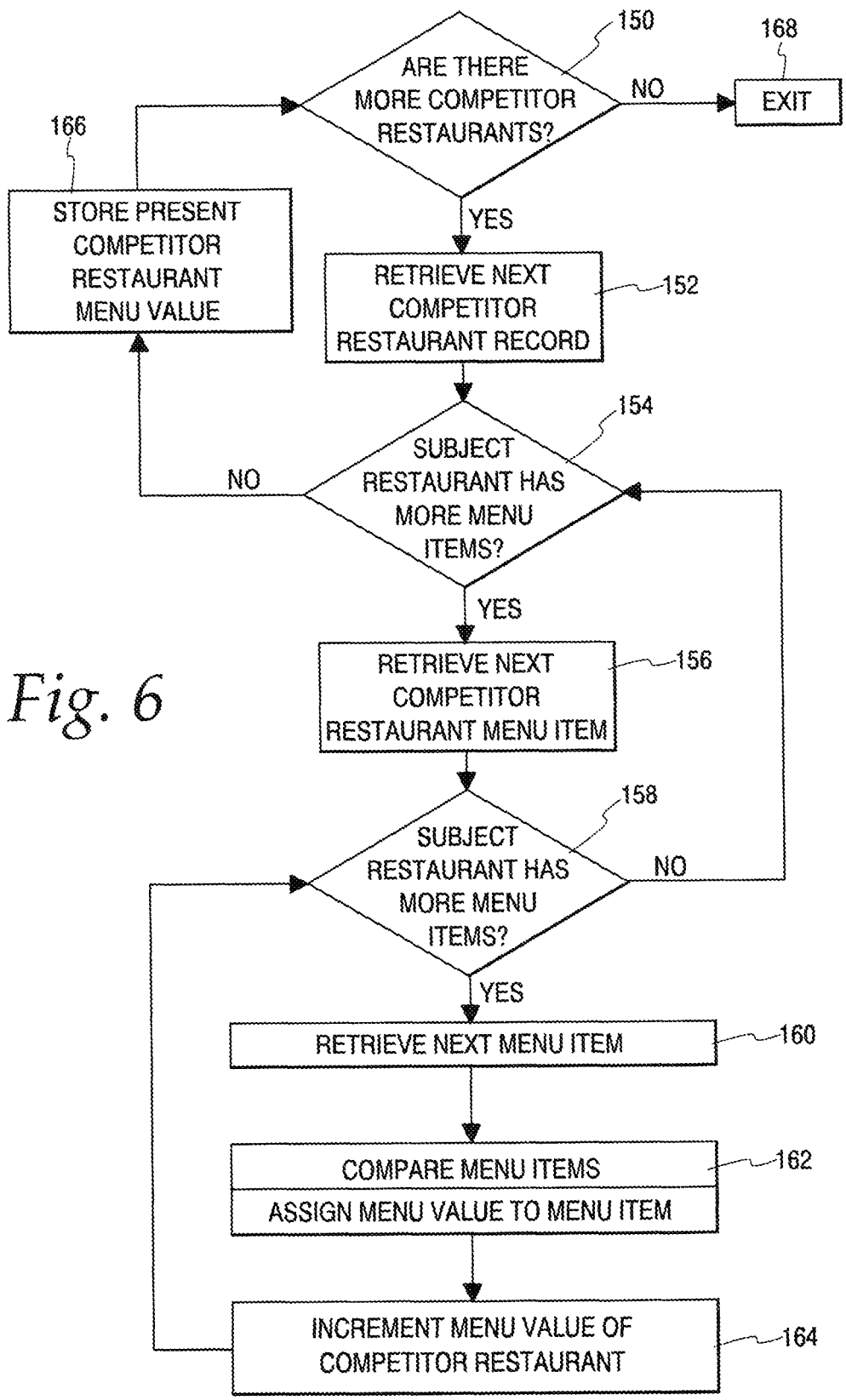
FIG. 6 is a flowchart illustrating a process by which the menu of a subject restaurant can be compared with the menus of competitor restaurants.

It is mentioned above in step 108 that the menu of the subject restaurant is compared with the menus of the remaining competitor restaurants. One way this can be accomplished is illustrated in the flow chart of FIG. 6. It should be noted that this process assumes that the subject restaurant has already been retrieved into memory. Accordingly, the process begins at step 150, where a check is made to determine if all of the competitor restaurants have been compared to the subject restaurant. If there are no competitor restaurants, execution transitions to step 168, where the process is exited. However, if there are more competitor restaurants to compare against the subject restaurant, execution transitions to step 152, where the next competitor is retrieved and becomes the present competitor restaurant. Execution then transitions to step 154, where a check is made to determine if all of the subject restaurant's menu items have been scored against the present competitor restaurant. If the subject restaurant has more menu items to score against the present competitor restaurant, execution transitions to step 156, where the next menu item of the subject restaurant is retrieved.

Execution then transitions to step 158 where a check is made to determine if the present competitor restaurant has more menu items to compare with the present menu item of the subject restaurant. If so, execution transitions to step 160, where the next menu item of the present competitor restaurant is retrieved. In step 162, the present menu item of the subject restaurant and the present competitor restaurant are compared and scored, and in step 164 the menu match score of the competitor restaurant is incremented by the match score of the last menu item.

Returning to step 154, if the subject restaurant does not have more menu items, execution transitions to step 166, where the score for the present competitor restaurant is stored. Execution then returns to step 150, where execution proceeds as previously discussed. With regards to step 158, if the present competitor restaurant does not have any more menu items, execution returns to step 154, where execution proceeds as previously discussed.

Step 162 discussed above requires that the menu items of two restaurants are compared and scored based on how similar they are. There are a variety of ways that this can be done. The simplest way to do this would be to compare the names of the menu items using a simple string comparison. Items that exactly matched could, for example, be given a value of one (1), while items that did not match could be given a value of zero (0). However, this method would not provide a very reliable comparison, as restaurants are likely to give different names to similar items. For example, one restaurant may call a hamburger with cheese a "cheeseburger," while another restaurant may refer to it as an "old fashioned burger with cheese."

An improved method of determining how close two menu items are to one another would be to employ a preprocessor, which would classify menu items for each restaurant using a common nomenclature. The preprocessor, which could be employed at the time that menus were input into the database or at any time thereafter, could produce an extra field associated with each menu item. Within the extra field, hereinafter referred to as the true item field, a hamburger with cheese would be the same regardless of the title that the restaurant gave it.

The comparison of true items would also allow for more granular grading of matches. For example, each true item could store a similarity to every other true item. Accordingly, a hamburger could be given a similarity of 0.9 to a cheeseburger, and vice-verse. However, such an approach would necessarily require a large amount of information to be assembled and stored for every food item. In particular, for a database of N true items, each true item would need to store an additional N−1 fields to account for its match to every other true item.

A different approach would be to group true items into a variety of types, such as salads, soups, lunch sandwiches, pizzas, steaks, etc. Simple items, such as a standard salad, would be assigned a 1.0 for the type salads, and a 0.0 for the remaining types. More difficult to classify items, such as a steak salad, would be assigned non-zero values for multiple types, such as 0.75 for salads, 0.25 for steaks, and 0.0 for the remaining fields. When two of the same true items were compared, a match score of 1.0 could be assigned, but when comparing different true items the scores in each type could be multiplied together and added to form a match score. For example, when comparing a steak salad to a regular salad, a match score of 0.75 would result.

Another way of determining how close two menu items are to one another would be to compare constituent ingredients. This would, of course, require that the database actually store the ingredients that comprise the various menu items. If the ingredients are available, each ingredient of the two menu items could be compared, and a score derived from the comparison. For example, if a menu item of a subject restaurant has ten ingredients, and a menu item of a competitor restaurant matches six ingredients, a match score of 0.6 could result. This model can, of course, be further adjusted so that only similar cuisines are compared. For example, a steak salad could give a high match score if compared to a steak taco, despite being very different food.

Other factors that can be used to compare menu items include dietary value, such as, for example, low-calorie, low carbohydrate, vegetarian, vegan, and gluten free, as well as food quality, such as standard, all-natural, organic, and locally produced or grown.

Figure 7:
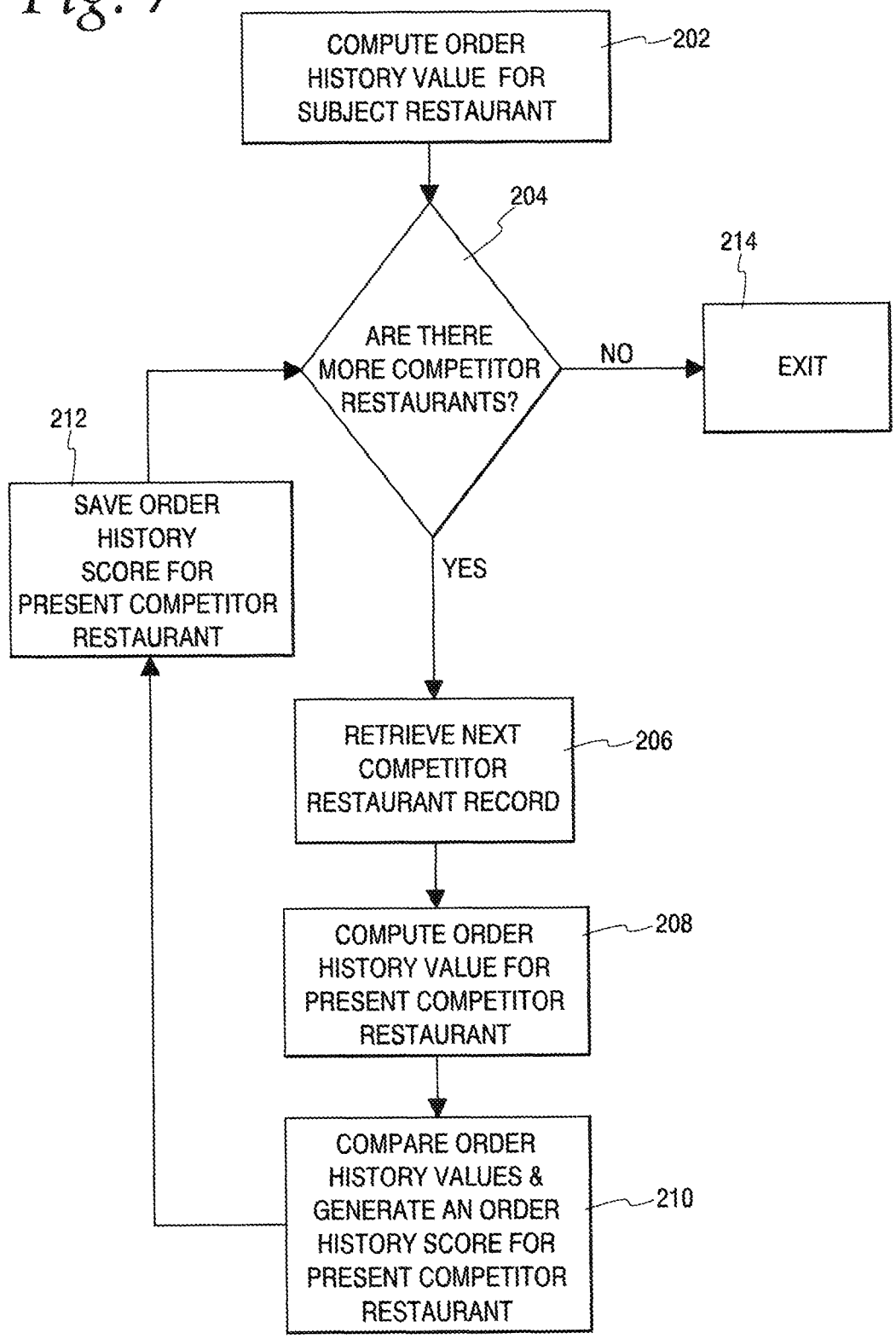
FIG. 7 is a flowchart illustrating a process by which the order history of a subject restaurant can be compared with the order histories of competitor restaurants.

Returning to FIG. 5, step 110 requires a comparison of the order history of the subject restaurant with competitor restaurants, to reflect the principle that a restaurant that serves gourmet sandwiches and burgers is not likely to compete directly with a fast food restaurant serving lunch sandwiches and burgers, even though their menus may be substantially identical. FIG. 7 is a flowchart illustrating a process by which order histories of restaurants can be compared and scored for similarity.

Starting with a step 202, an order history value for the subject restaurant is computed. Execution then transitions to step 204, where a check is made to determine if there are more competitor restaurants with which to compare order histories. If none remain, execution transitions to step 214 where the order history comparison process exits. However, if additional competitor restaurants remain, the next competitor restaurant is retrieved and marked as the present competitor restaurant in step 206. The order history of the present competitor restaurant is retrieved and an order history value is computed in step 208, and a comparison between the order history values of the present competitor restaurant and the subject restaurant is conducted and scored in step 210. Execution then transitions to step 212, where the order history score for the competitor restaurant is saved. Execution then returns to step 204, where execution proceeds as previously discussed.

The above process discussed computing the "order history value" for the subject restaurant and each competitor of the subject restaurant. One way that an order history value can be computed would be to compute the mean, or average, value of an order for the entirety of a restaurant's order history, or a subsection thereof. It is also fairly simple to determine if a restaurant's average order size is similar to another restaurant, and therefore, it is fairly simple to "score" the similarity of one restaurant's order history to another using the average order size. For example, if one restaurant has an average order size of $29, while another has an average order size of $11, it is likely that the two restaurants are not in direct competition; on the contrary, if one restaurant has an average order size of $13 and another has an average order size of $11, it is far more likely that they are in competition. Given the above, one way to compare the average values would be to use a fixed range value, such as $3.50, as an offset from the average order size. Accordingly, if a subject restaurant had an average order size of $10, any restaurant's with an average order size of between $6.50 and $13.50 would be judged a potential competitor, and given an order history competition score of 1, while restaurant's with an order size outside of that range would be given a score of 0. One simple variation would be to vary the range value based on the type of restaurant. For example, fast food restaurants could use a range value of $1.80, while pizza restaurants could use a range value of $3.20, etc.

Another simple extension of the above would be to vary the size of the offset used for comparison based on the order history. One way to do this would be to use a fixed percentage of the average order size, such as, for example 10%. Another way would be to use the standard deviation of the order history subset from which the average value was computed. Standard deviation of a set can be computed using the following formula:

$$\sigma = \sqrt{\Sigma_{i=1}^{n}(m-x_i)^2}$$

Where $\sigma$ is the standard deviation, m is the mean value of a set having n members, and $x_i$ is the ith member of a set having n members. Expressed in words, the standard deviation is the square root of the sum of the square of the difference between the mean and each set member. For example, assume that a subject restaurant has an order history with the following five order amounts: $13, $9, $17, $11, $11.50. The mean, or average of these orders would be $12.30, and the standard deviation would be $5.98.

Assuming that order sizes are normally distributed, one standard deviation from the mean will account for 68.27% of all orders within the set of orders used to compute the standard deviation, while using two standard deviations would account for 95.45% of orders. Accordingly, given the example above, one way of grading the orders would be to use an "all-or-nothing" scoring system, and thereby assign a value of 1 to any restaurant whose average order size is within, for example, 1 or 2 standard deviations of the order size of the subject restaurant.

A further refinement that can be applied to any of the order history competitive scoring systems discussed above would be to scale the competitive score of a restaurant based on how far apart the average order sizes Were. With reference to the last system discussed above, if a subject restaurant has an average order size of $10 and a standard deviation of $1, a zero value could be assigned to restaurants with, for example, an average order size 3 standard deviations away; i.e., less thin or equal to $7 or greater than or equal to $13. Intermediate values could be linearly interpolated within that range, so that competitive restaurants with an average order size identical to that of the subject restaurant, $10 in this case, would be given a value of 1. Accordingly, a competitive restaurant with an average order size of $8.50 or $11.50 would be assigned an order history score of 0.5, etc.

A simpler way of comparing the order history of the subject restaurant with a competitor's order history would be to compare the daily volume of orders that each restaurant processed. This could be done by comparing average daily order volume as discussed earlier for order size, with the average daily order volume being computed, for example, over a week, a month, or a quarter. Similarly, standard deviation of order volume computed over a period can also be useful for comparing the order volume of a subject restaurant and a competitor restaurant.

An additional, longer term, comparison of order histories can also be used to determine if the subject restaurant and a particular competitor have a similar seasonal pattern. If the seasonal pattern diverges significantly, this can be indicative that the restaurants may only compete part of the year, rather than year round. One way to compute a seasonal pattern for the sales of a restaurant would be to compute the total sales for a quarter, and compare those sales on a quarter-to-quarter basis with other quarters. Similarly, sales could be computed on a month of the year basis, or a week of the year basis. Then a comparison can be made from one time period to another; i.e., quarter-to-quarter, month-to-month, week-to-week, etc., to determine if particular time periods consistently perform better or worse than other time periods. For example, it would be expected that ice cream parlors in the Midwest would perform consistently better in summer than winter, while other restaurant's would likely have the opposite pattern. By comparing seasonal patterns of potentially competing restaurant's competitors that are not readily apparent may be found. For example, competitors of restaurants that specialize in serving Holiday parties may not be easily determined in other ways.

One way to compare the seasonal pattern of sales for a subject restaurant, and a potential competitor restaurant would be to calculate the total sales for each on a monthly basis over the period of, for example, five years. An average monthly sales number can then be computed, and the standard deviation calculated as discussed previously. Each month can then be compared to the average and the standard deviation, and, months that vary from the standard deviation by more than some particular value can be computed. The month-to-month variation of the subject restaurant can then be correlated with the month-to-month variation of the potential competitor restaurant using, for example, a Pearson correlation analysis. The correlation analysis will return a value between 0 and 1, which can be used as a seasonal pattern score that is indicative of the level of competition between the two restaurants.

One issue with computing a seasonal pattern is determining if a trend is present in the seasonal data, such as would be present for a rapidly growing (or shrinking) restaurant. However, there are numerous methods well-known in the art to detrend data. For example, the use of detrended fluctuation analysis can be used to remove the trend component of the analyzed order data.

Another improvement that can be made is to more accurately model the radius within which diners search for pickup and delivery restaurants. One way that this can be done is to acknowledge that diners will have variable tolerances for the distance that they will look for restaurants. While one diner may be willing to patronize only restaurants within 8 blocks of his residence, another diner may be willing to patronize restaurants as far away as 5 miles from her residence. The preferences of diners as to a maximum radius they are willing to travel to patronize a pickup or delivery restaurant is likely to vary with a number of factors. For example, diners in New York, who usually walk, may uniformly have a lower maximum radius than diners in Los Angeles, who usually drive. However, some variance among the diners in each market is likely. Accordingly, one way to model diner preferences for their maximum restaurant patronizing distance would be conduct market surveys to determine a distribution function for each market area, such as a particular city, or a particular neighborhood within a city. Alternatively, a restaurant service could actually access data regarding diners ordering habits and determine for a particular market the distribution of distances that diners place orders with restaurants. Assuming a more or less normal distribution of preferences among diners, a distribution function can be modeled with a mean maximum restaurant patronizing distance, and a standard deviation.

Figure 8:
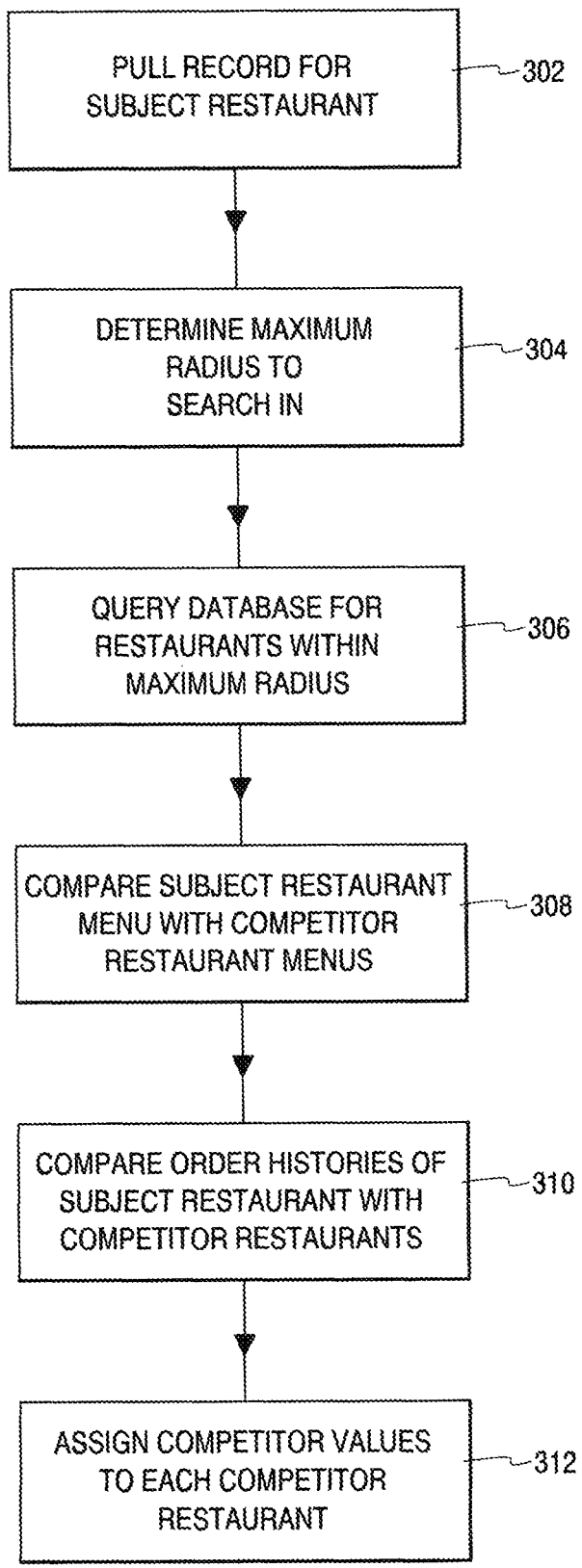
FIG. 8 is a flowchart illustrating a third process by which a utility can programmatically determine the competitors of a subject restaurant.

To make effective use of a distribution function for the maximum restaurant patronizing distance, a modification to the process of FIG. 5 must be made, as is reflected in FIG. 8. In step 302, the record for the subject restaurant is retrieved from the database. In step 304, a maximum radius is determined. One way of doing this would be to use a distance 3 standard deviations greater than the mean maximum restaurant patronizing distance, which should account for approximately 99.7% of diners' preferences.

In step 306, restaurants within the "maximum radius" are retrieved from the database, and are assigned a distance value. One way that this can be done would be to linearly interpolate based on distance, so those competitor restaurants that are very close to the subject restaurant are assigned a distance score close to 1, while those that are far away, e.g., close to a 3 standard deviations of the maximum restaurant patronizing distance distribution function away, would be assigned a distance value close to 0.

In step 308, the subject restaurant's menu is compared with the competitor restaurant menus, and each competitor restaurant is assigned a menu score. The comparison process can, for example, follow the process outlined in FIG. 3. Execution then transitions to step 310, where the order history of the subject restaurant and the competitor restaurants are compared, using, for example, the process outlined in FIG. 4. In step 312, the distance value, the menu value and the order history values are combined, and a set of competitors, each with a competition score, is assembled and output.

Figure 9A:
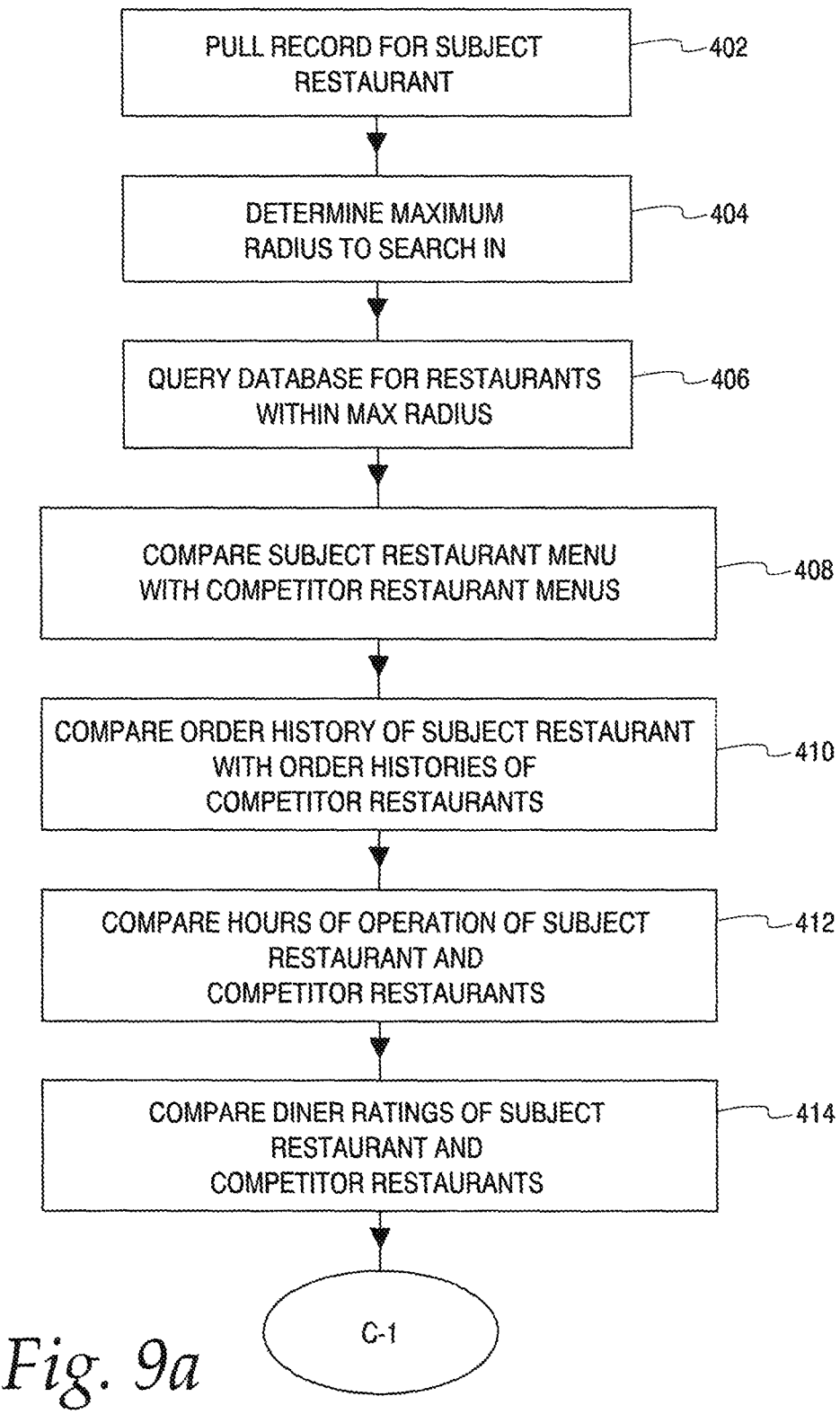

FIGS. 9*a* and 9*b* comprise a flow chart depicting a third process by which software with access to database 14 can assemble a list of most important competitors for a subject restaurant. In a first step 402, a record corresponding to the subject restaurant is retrieved from the database 14. In the next step 404, a maximum radius to search for competitor restaurants is determined, and, in step 406, a database query is made to determine those restaurants within the maximum search radius. In step 408, the menus of the remaining competitor restaurants are compared with the menu of the subject restaurant. Similarly, in step 410, the order histories of the remaining competitor restaurants are compared with the order history of the subject restaurant. Unlike the process of FIG. 8, however, this process adds a number of additional steps to further improve competitor comparisons.

In step 412, the hours of operation of the subject restaurant are compared with the hours of operation of the competitor restaurants and an hours of operation score for each potential competitor is developed. In step 414, diner ratings for the subject restaurant are compared with the diner ratings of the competitor restaurants, and a diner rating score for each potential competitor is developed. In step 416, the delivery radius of the subject restaurant is compared with the delivery radius of the competitor restaurants, and a delivery radius score for each potential competitor is developed. In step 418, delivery fees charged by the subject restaurant are compared with delivery fees charged by competitor restaurants, and a delivery fee score for each potential competitor is developed. In step 420, order minimums for the subject restaurant are compared with order minimums for the competitor restaurants, and an order minimum score for each potential competitor is developed.

Figure 10:
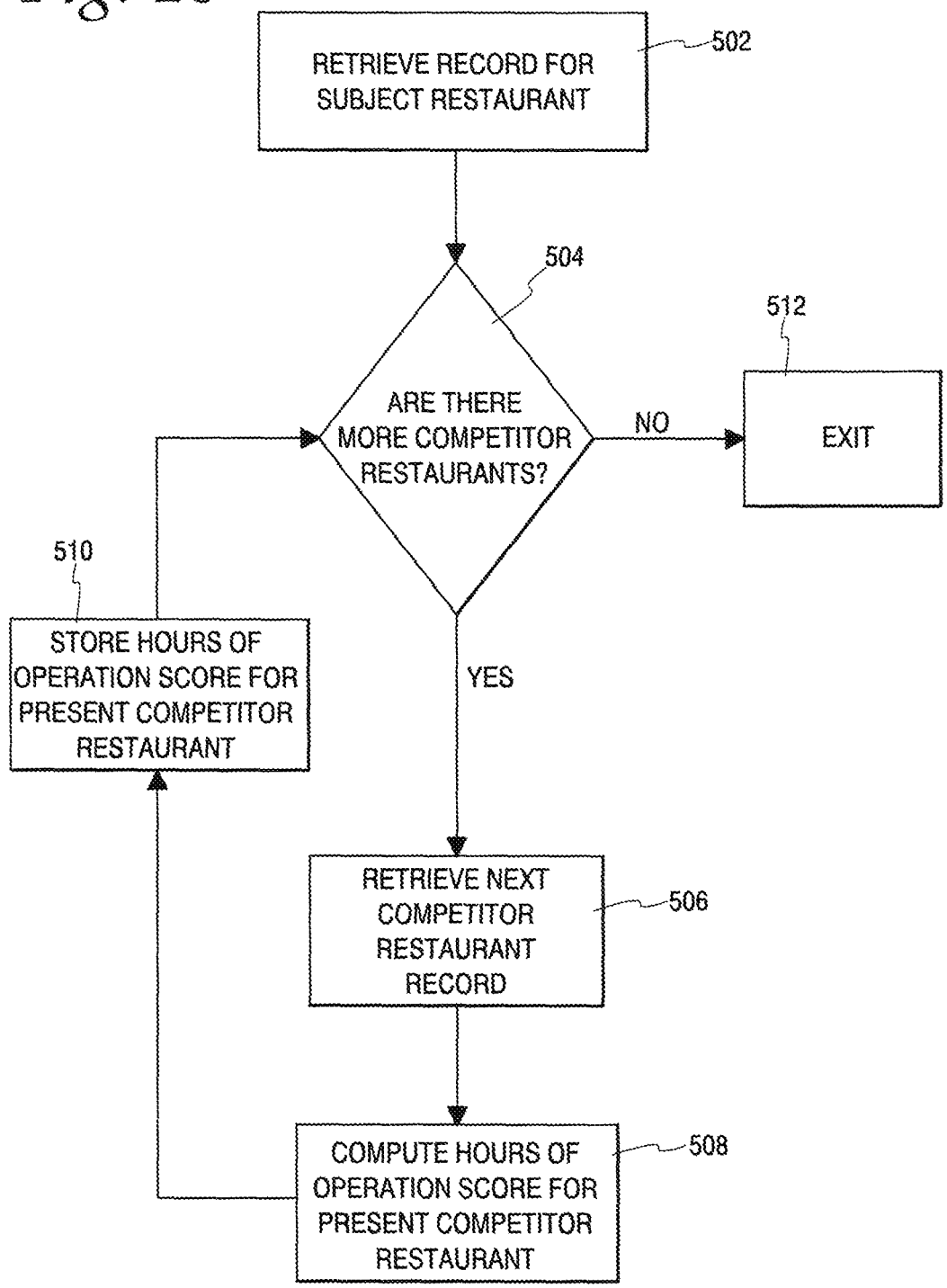
FIG. 10 is a flowchart illustrating a process by which the hours of operation of a subject restaurant can be compared with the hours of operation of the subject restaurant's potential competitors.

FIG. 10 is a flow chart that illustrates the process by which the hours of operation for a subject restaurant can be compared with the hours of operation of its competitors, and an hours of operation score can be programmatically computed. In step 502, the database record for the subject restaurant is retrieved from the database. In step 504, a check is made to determine if there are more competitor restaurants to compare hours of operation with. If there are not, the process exits in step 512. However, if there are more competitor restaurants, execution transitions to step 506, where the next competitor restaurant is retrieved. In step 508, the hours of operation of the subject restaurant and the present competitor restaurant are compared and an hours of operation score is computed. In step 510, the hours of operation score for the present competitor is saved for future use. Execution then returns to step 504.

An hours of operation score that is indicative of the degree of competition between a subject restaurant and a potential competitor can be developed by comparing the degree of overlap of operating hours between the subject restaurant and the potential competitor. For example, if the subject restaurant is open from 6:30 AM through 2:00 PM, a total of 7.5 hours, and a competitor is open from 11 AM through 9 PM, the competitor's hours of operation match a total of three hours of the subject restaurant, which would give a score of 3/7.5, or 0.4.

Figure 11:
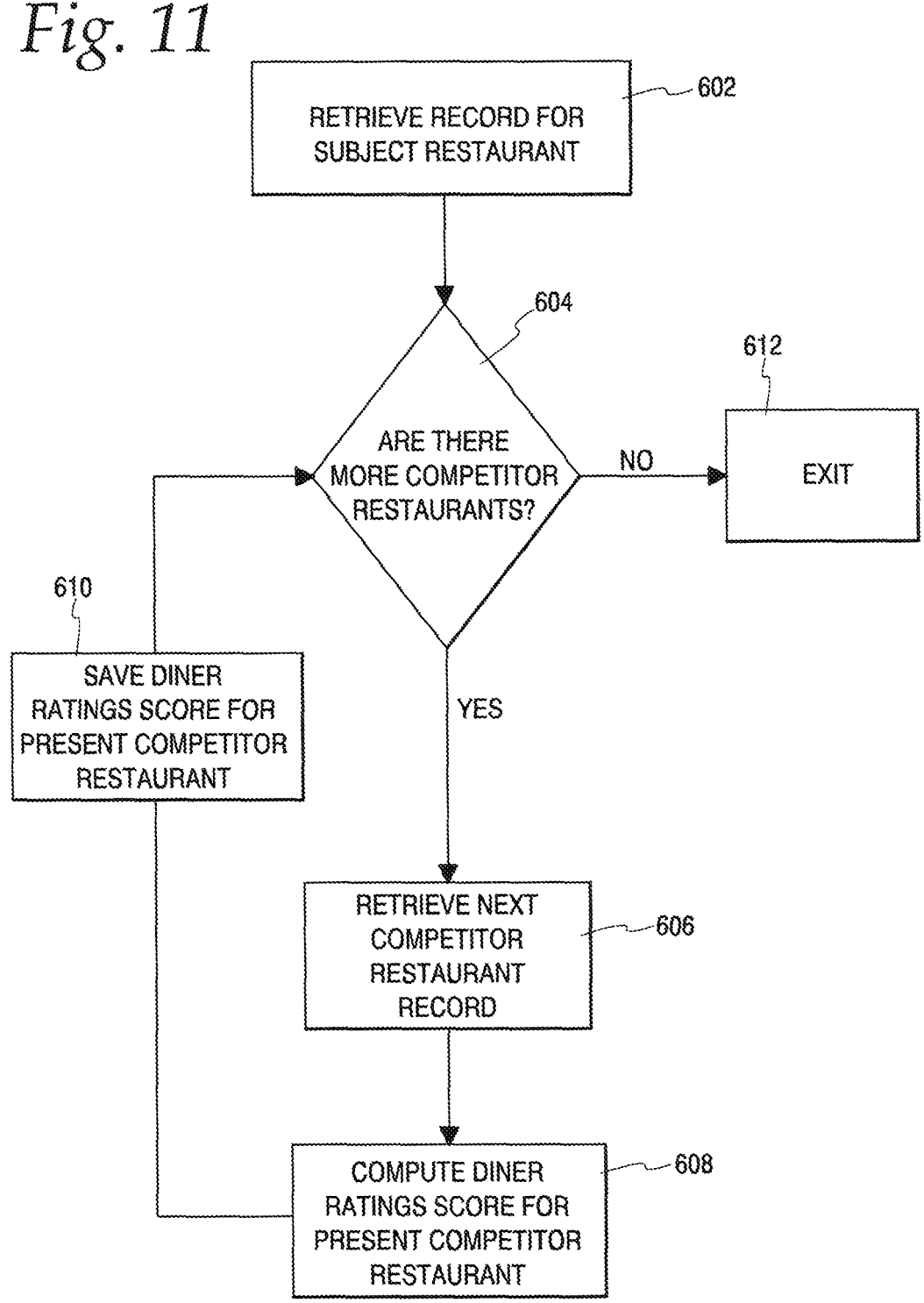
FIG. 11 is a flowchart illustrating a process by which the diner ratings of a subject restaurant can be compared with the diner ratings of the subject restaurant's potential competitors.

FIG. 11 is a flow chart that illustrates the process by which diner ratings for a subject restaurant can be compared with its competitors' diner ratings, and a diner ratings score can be programmatically computed. In step 602, the database record for the subject restaurant is retrieved from the database. In step 604, a check is made to determine if there are more competitor restaurants to diner ratings with. If there are not, the process exits in step 612. However, if there are more competitor restaurants, execution transitions to step 606, where the next competitor restaurant is retrieved. In step 608, the diner ratings of the subject restaurant and the present competitor restaurant are compared and a diner ratings score is computed. In step 610, the diner ratings score for the present competitor is saved for future use. Execution then returns to step 604.

Assuming that diners are required to assign a numeric value to a particular restaurant, then a diner ratings score that is indicative of the degree of competition between a subject restaurant and a potential competitor can be developed by computing the average value of the subject restaurant's diner ratings, and comparing that with the average value of a competitor's diner ratings. One way to compute a diner ratings score indicative of the degree of competition between the restaurants would be to use the following formula:

$$S = \frac{S_{Max} - |R_{AS} - R_{AC}|}{S_{Max}}$$

Where, S is the computed diner rating score, SMax is the maximum possible diner rating score, $R_{AS}$ is the average rating of the subject restaurant, and $R_{AC}$ is the average rating of the competitor restaurant.

For example, if the diner ratings of the subject restaurant have an average value of 4.0 (out of 5) and the diner ratings of a competitor have an average value of 3.2 (out of 5), then, using the formula above, the diner rating score would be (5−0.8)/5=0.84.

Figure 12:
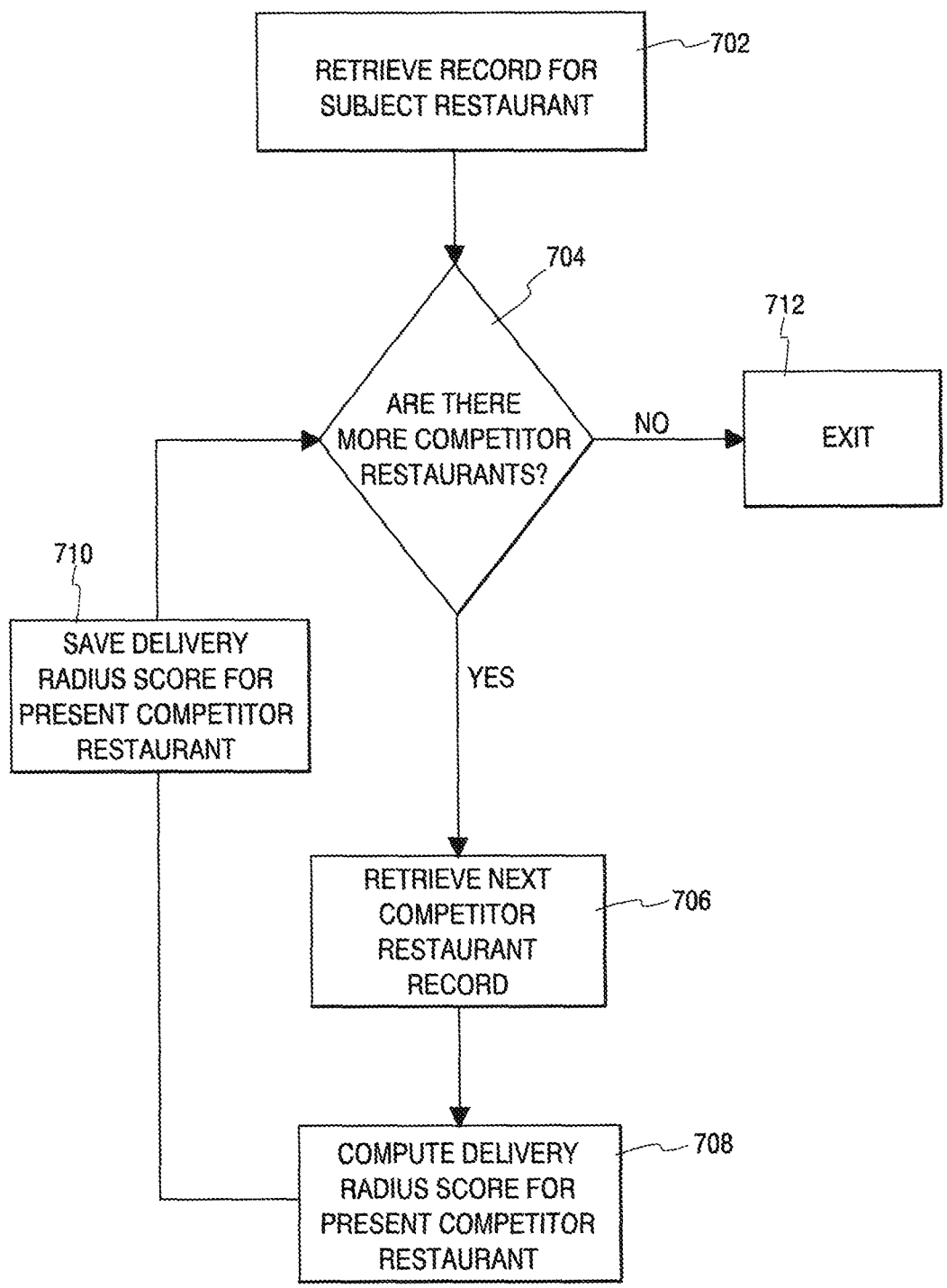
FIG. 12 is a flowchart illustrating a process by which by which the delivery radius of a subject restaurant can be compared with the delivery radii of the subject restaurant's potential competitors.
Figure 13:
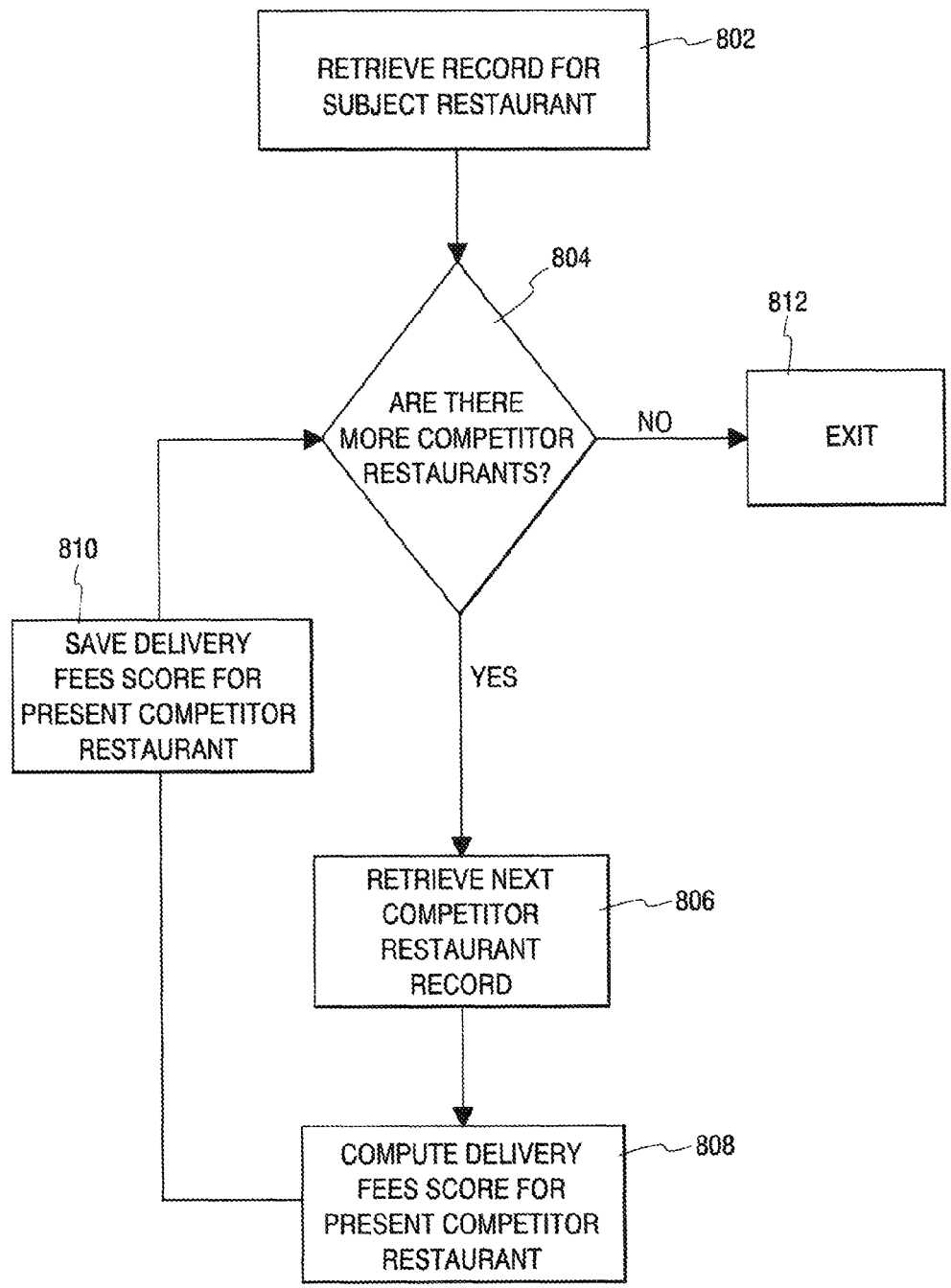
FIG. 13 is a flowchart illustrating a process by which the delivery fees of a subject restaurant can be compared with the delivery fees of the subject restaurant's potential competitors.
Figure 14:
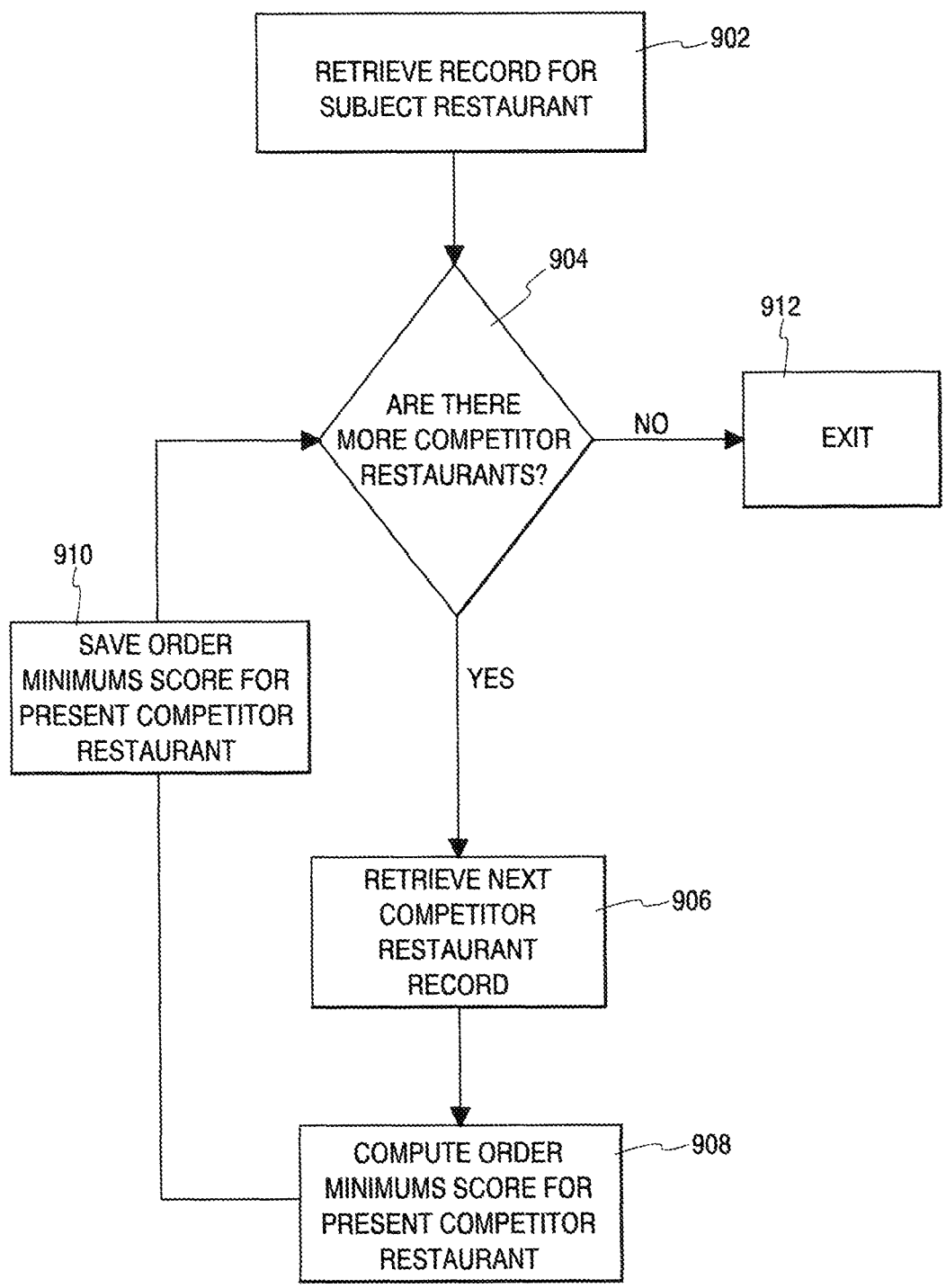
FIG. 14 is a flowchart illustrating a process by which the order minimums of a subject restaurant can be compared with the order minimums of the subject restaurant's potential competitors.

FIG. 12 is a flow chart that illustrates the process by which the delivery radius of a subject restaurant can be compared with its competitors' delivery radii, and a delivery radius score can be programmatically computed. In step 702, the database record for the subject restaurant is retrieved from the database. In step 704, a check is made to determine if there are more competitor restaurants to compare delivery radii with. If there are not, the process exits in step 712. However, if there are more competitor restaurants, execution transitions to step 706, where the next competitor restaurant is retrieved. In step 708, the delivery radius of the subject restaurant and the present competitor restaurant are compared and a delivery radius score is computed. In step 710, the delivery radius score for the present competitor is saved for future use. Execution then returns to step 704.

II. Utility for Determining Competitive Advantage of a Subject Business

Figure 15:
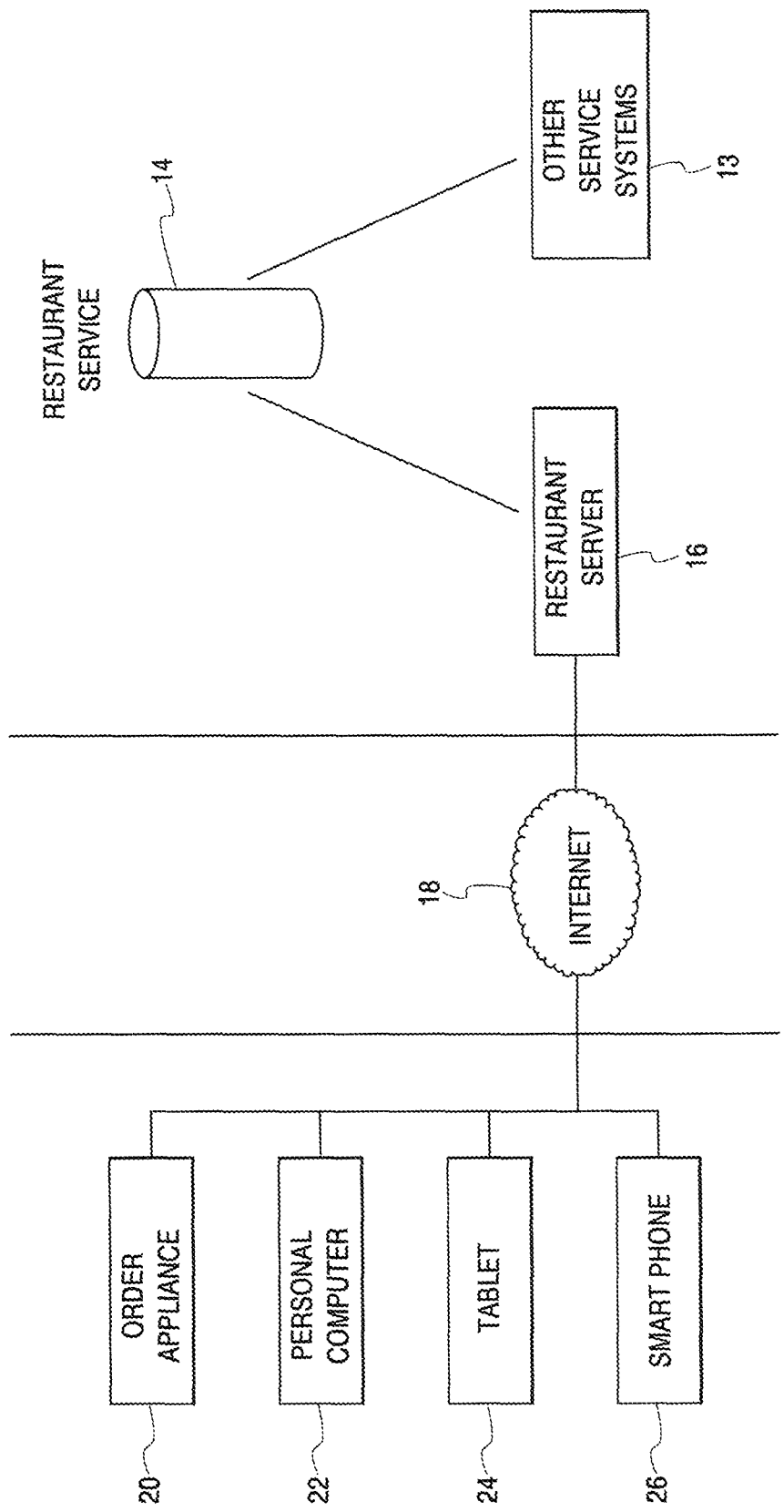
FIG. 15 is a simplified system diagram of a system implementing the disclosed competitive advantage utility.

Turning to FIG. 15, a simplified system diagram depicting a system for analyzing the strengths and weaknesses of a business. While the business discussed herein is a restaurant, the system and method disclosed can be adapted to a wide variety of businesses by a person of skill in the art.

A restaurant server 16 is coupled to a database 14 that is maintained by a restaurant service. The database is coupled to the restaurant service's system 13 for order placement by diners with member restaurants, and, maintains a record of any orders placed by diners in real-time. The restaurant server 16 is coupled to various devices over the Internet 18. The coupled devices can include, for example, an order appliance 20, as described in earlier filed U.S. patent application Ser. No. 13/337,362, titled "Read Time Integrated Shopping Service," filed Dec. 27, 2011, a personal computer 22, a tablet computer 24 or a wireless mobile device 26.

The restaurant server 16 operates to communicate data with any of the coupled devices. For example, the restaurant server 16 can serve a web page, or communicate with an application operating on any of the coupled devices via, for example, XML over HTTP. Only restaurants that are members of the restaurant service are permitted to access the competitive advantage utility. Accordingly, an access means, such as a username and password or some other unique identifier, are used to limit access to the competitive advantage web page or application. Each member restaurant is designated its own access means; i.e., a different username. In one embodiment of the disclosed competitive advantage utility, each order appliance may have a unique code assigned to it that corresponds to the restaurant it is assigned to. This unique code can make for a simple access means, as the software operating on the order appliance can automatically upload the unique code to the restaurant service, which can assume that anyone with access to the order appliance is authorized to access the competitive utility. However, this does not preclude the use of a password, or other identifier, coupled with the unique code assigned to the order appliance.

Figure 16:
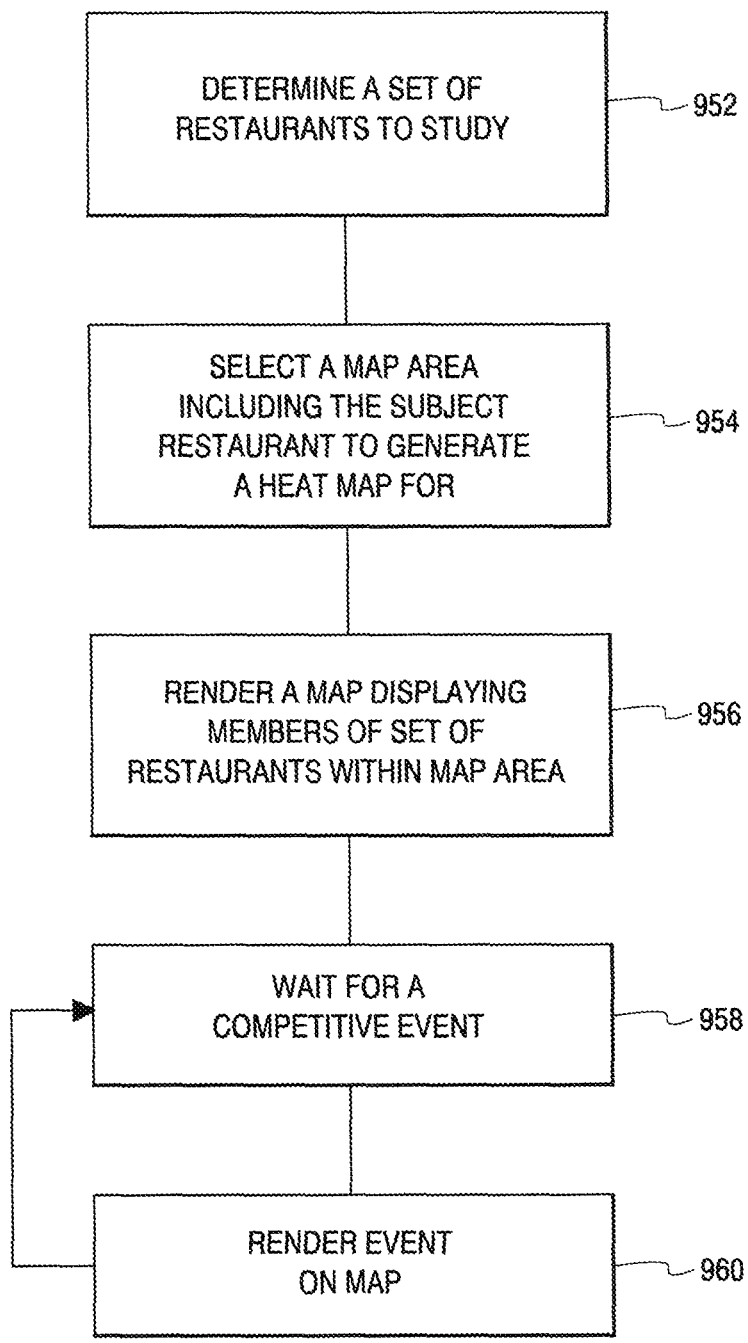
FIG. 16 is a flowchart illustrating a process by which a heatmap of competitive activity can be assembled and displayed.

FIG. 16 depicts a flowchart describing a process by which a utility can generate a near real-time or real-time heat map of competitive activity. In step 952 a set of restaurants to be studied is assembled. The set of assembled restaurants can include any arbitrary grouping of restaurants, such as, for example, i) the subject restaurant, ii) a group of competitor restaurants that are manually chosen, iii) a group of competitor restaurants that are determined automatically using any of the systems and methods discussed earlier in this disclosure, iv) a group of all restaurants within a user defined distance of the subject restaurant. In step 954, a user of the utility selects a map area including the subject restaurant within which to generate the heat map. This selection can be done via manual input; i.e., a text box, or through a graphical interface such as that described later herein. The process of selecting the map area can be through the specification of a distance, so that a circular radius around the subject restaurant is included. Other ways that a map area can be specified include, but are not limited to, 1) using the delivery area of the subject restaurant as stored in the restaurant service database; 2) selecting multiple coordinates; i.e., latitude-longitude pairs, so that an elliptical area can be specified, 3) selecting multiple coordinates to that a rectangular or square area can be specified, and 4) selecting a series of coordinates tracing out an arbitrary closed area, with the last coordinate, being equal to the first coordinate, and thereby closing the area. In step 956, a map displaying the members of the set of restaurants derived in step 952 and within the map area selected in step 954 is displayed. In step 958, the utility monitors the database for a competitive event, such as an order to a restaurant within the assembled step, and in step 960, the event is rendered on the map.

One use of the process of FIG. 16 is to track competitive activity from a pool of competitor restaurants. For example, a restaurant manager may configure the utility to replay the lunch period i.e., approximately 11:30 AM to 1:30 PM in most U.S. cities, for several weeks, and the view of FIGS. 18 and 19 will allow her to observe orders that are placed with competitors during those periods, and compare them to orders placed with the manager's own restaurant. If a particular restaurant is generating large number of orders in a period consistently, this could lead the restaurant manager to plan a promotion targeting that restaurant's diners, or to examine that restaurant's menu and the particular items being ordered with an eye toward improving the subject restaurant's offerings. Another use of the process of FIG. 16 would be to track the ordering activity of diners within the designated area, either as the orders occur in near real time or real time, or as a replay of prior activity, such as the lunch period of some number of days. The area could be set to, for example, the delivery area of the restaurant and order flow could be examined. It could then be changed to be slightly greater than the delivery area, and examined again. If order activity to competitors increases significantly, it would indicate to the manager of the subject restaurant that increasing the delivery area could potentially be profitable. In addition, the view of diner activity can be used to target geographical locations, such as the distribution of coupons in a geographic area, or assembling a list of diner emails to whom to send promotions to. The following figures graphically illustrate these processes.

Turning to FIG. 17, a screen from the utility for determining competitive advantage is depicted. This Screen depicts a portion of a neighborhood centered about a subject restaurant 1002. Using the interface of this screen, a user can graphically set a radius in which a heat map will be generated, as required by the step 954 of the process of FIG. 16. In particular, as depicted, a first radius 1010 captures all restaurants within a first specified distance, such as, for example, 1.5 city blocks, while a second radius 1012 encompasses a larger distance, such as, for example, 4 blocks. The first radius encompasses competitive restaurants 1004a-1004d, although it should be noted that 1004d is barely within the first radius 1010. The second radius encompasses not only competitive restaurants 1004a-1004d, but also competitive restaurants 1005a-1005j. However, neither radius encompasses competitive restaurants 1006a-1006j.

Turning to FIG. 18a, a screen depicting a map encompassing the first radius 1010 of FIG. 17 is depicted. This view encompasses the subject restaurant 1002 and a small number of competitor restaurants 1004a-1004d. While only a small number of competitors are depicted, there is ample room to display orders as they are logged, as depicted in FIG. 18b. Similar to FIG. 18b, FIG. 18c displays orders in real time, but the order balloons are tied to the locations of diners ordering meals. On the contrary, FIG. 19a displays not only competitors 1004a-1004d, but also competitors 1005a-1005j. While the greater number of competitors generates more useful information, the display of that information is extremely crowded during "hot periods," such as lunch and dinner time, when numerous orders are logged. This creates a "crowded" view of the near real-time or real-time competitive Information, as depicted in FIG. 19b. Similarly, FIG. 19c displays the same view as FIG. 19b, but order balloons are tied to the locations of diners ordering meals.

As discussed so far, the disclosed competitive advantage utility has displayed all orders to restaurants within the assembled set. However, this is not a limitation of the disclosed utility; in particular, the orders that are examined can be more narrowly tailored, so that only orders of a specified item are displayed. For example, a restaurant manager may be interested in evaluating her restaurant's burger offerings versus competitors' burger offerings. Accordingly, the manager could monitor pickup and delivery orders over a specified area for a period of time to determine if a particular competitor is receiving a disproportionate share of burger orders.

The disclosed competitive advantage utility can also be used to generate heatmaps for aggregate competitive activity. Aggregate competitive activity refers to, for example, a collection of competitive activity accumulated over a number of different competitors, a specific time period, or collection of time periods, or a compilation of competitors and time periods.

Figure 20:
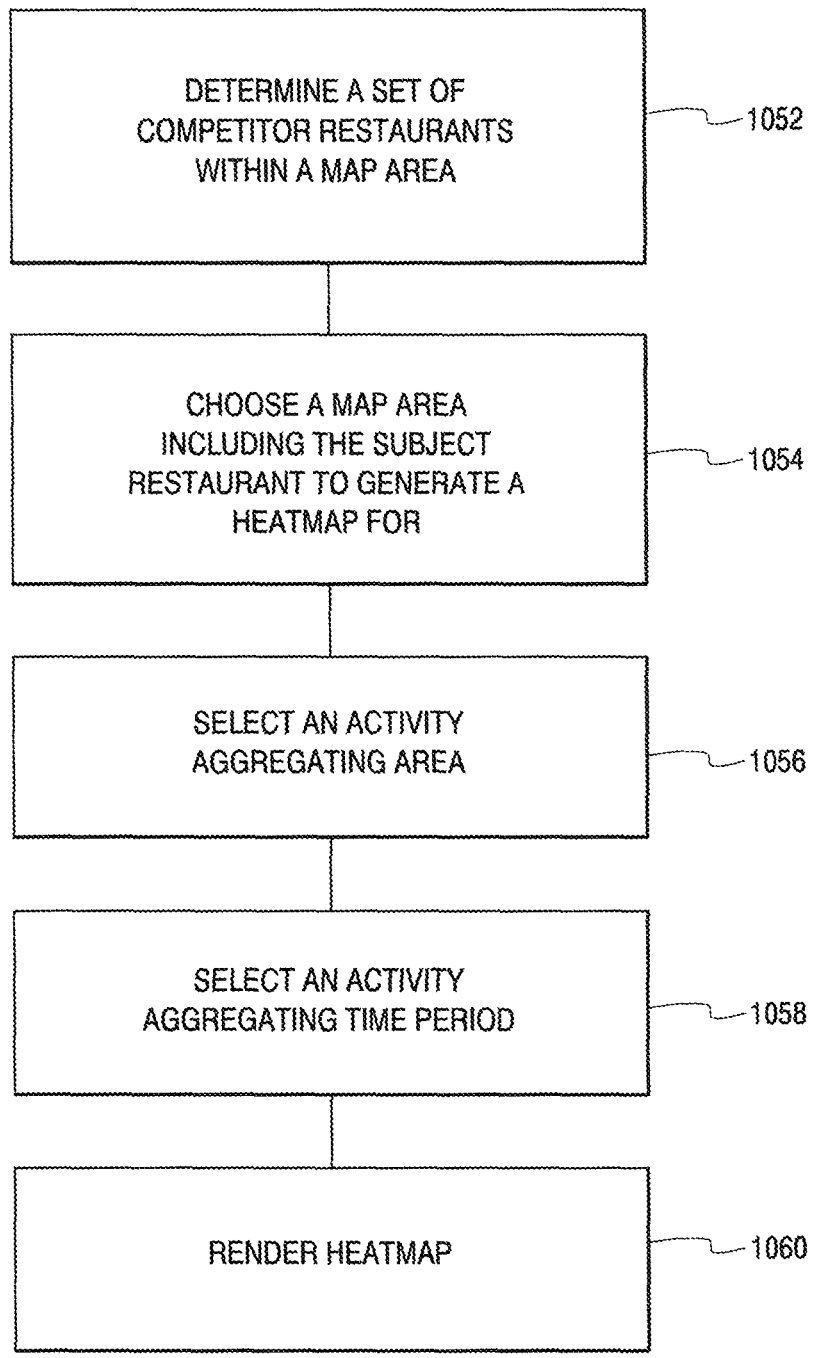
FIG. 20 is a flowchart illustrating a process by which a heatmap of aggregate competitive activity can be assembled and displayed.

FIG. 20 depicts a flowchart of a process by which the competitive advantage utility can generate a heat map of aggregate competitive activity. In step 1052 a set of restaurants is assembled similar to step 952. In step 1054, a user of the utility selects a map area including the subject restaurant within which to generate the heat map. In step 1056, the user selects an area over which competitive activity will be aggregated, such as, for example, 4 square blocks, or 1 square mile.

Similarly, in step 1058, the user selects a time period over which to aggregate competitive activity, such as 5 minutes, 30 minutes, or 1 day.

In step 1060, the user defines a playback schedule. In one embodiment of the disclosed competitive advantage utility, the playback period is a single continuous time period; such as, for example, 11:30 AM-2:30 PM on Apr. 17, 2012. However, in a separate embodiment of the disclosed competitive advantage utility, the playback schedule can be a number of continuous time periods. For example, the playback schedule can be a number of related continuous time periods, such as 4 consecutive Tuesday lunch periods; i.e., 11:30 AM-2:30 PM on Apr. 17, 2012, 11:30 AM-2:30 PM on Apr. 24, 2012, 11:30 AM-2:30 PM on May 1, 2012 and 11:30 AM-2:30 PM on May 8, 2012. However, if the user of the competitive advantage utility desires to view unrelated time periods that is also within the scope of the disclosed competitive advantage utility. For example, if a restaurant manager desires to look at 3 random time periods, such as 1:30-2:45 PM on Mar. 7, 2012, 11:15 AM-12:30 PM on Apr. 19, 2012, and 7:30 PM-10:00 PM on May 4, 2012, the user could set that up as the playback schedule.

Figure 21A:
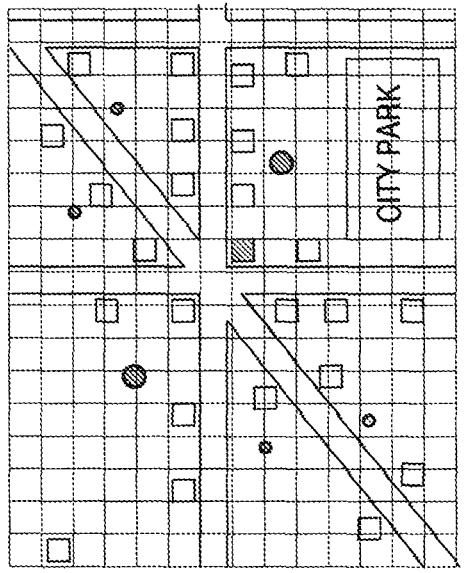
FIGS. 21a-d are a sequence of heatmaps illustrating aggregated competitive activity for the displayed neighborhood at different times.
Figure 21B:
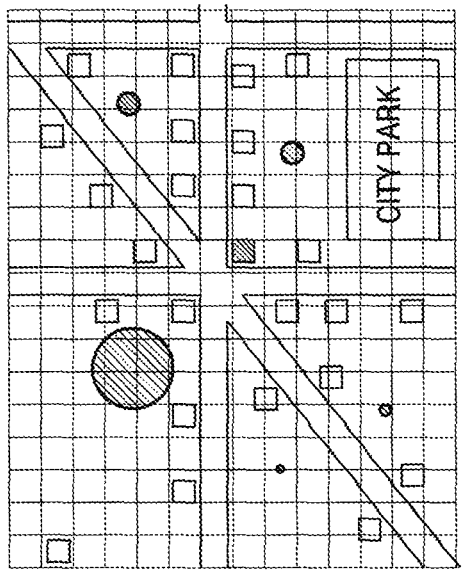
Figure 21C:
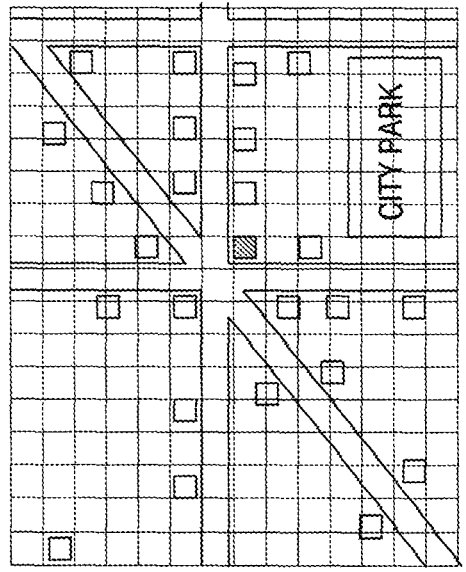
Figure 21D:
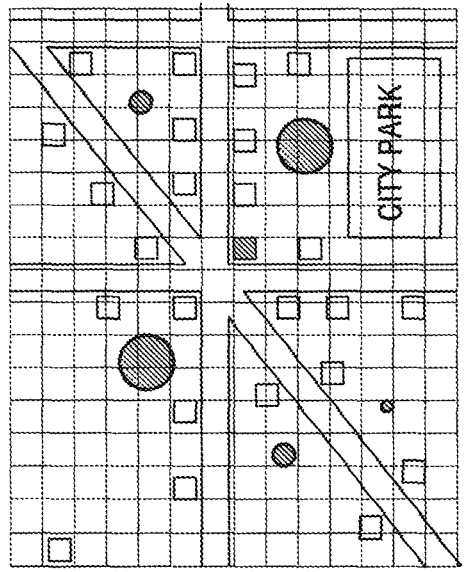

In step 1062, the aggregate heat map is rendered. In particular, starting at the beginning of the first playback period, the competitive advantage utility displays an indication of the aggregate competitive activity within each activity aggregating area. As better illustrated in FIG. 21a, the activity aggregating area effectively defines a grid which is overlaid on the area; i.e., the activity aggregating area is effectively a quantum of area over which all orders are aggregated within a time period as described below. The amount of competitive activity may be displayed as the raw competitive activity indicia; i.e., the number of orders, in a particular aggregating time period. However, the amount of competitive activity is preferably displayed in a manner that shows the relative amount of activity in a particular area/time period versus other area/time periods, as discussed later in this disclosure. The playback schedule is stepped through using the aggregating time period as a time quantum, and each activity aggregating area is updated for each time step. The amount of time that each step is displayed can be configured by the user. FIGS. 21b-d illustrate three steps of an aggregate heat map. It should be noted that certain activity indicia are displayed as larger than a single grid unit; however, within the present embodiment of the disclosed competitive advantage utility, each of these is assigned to a single activity aggregating area.

Figure 22:
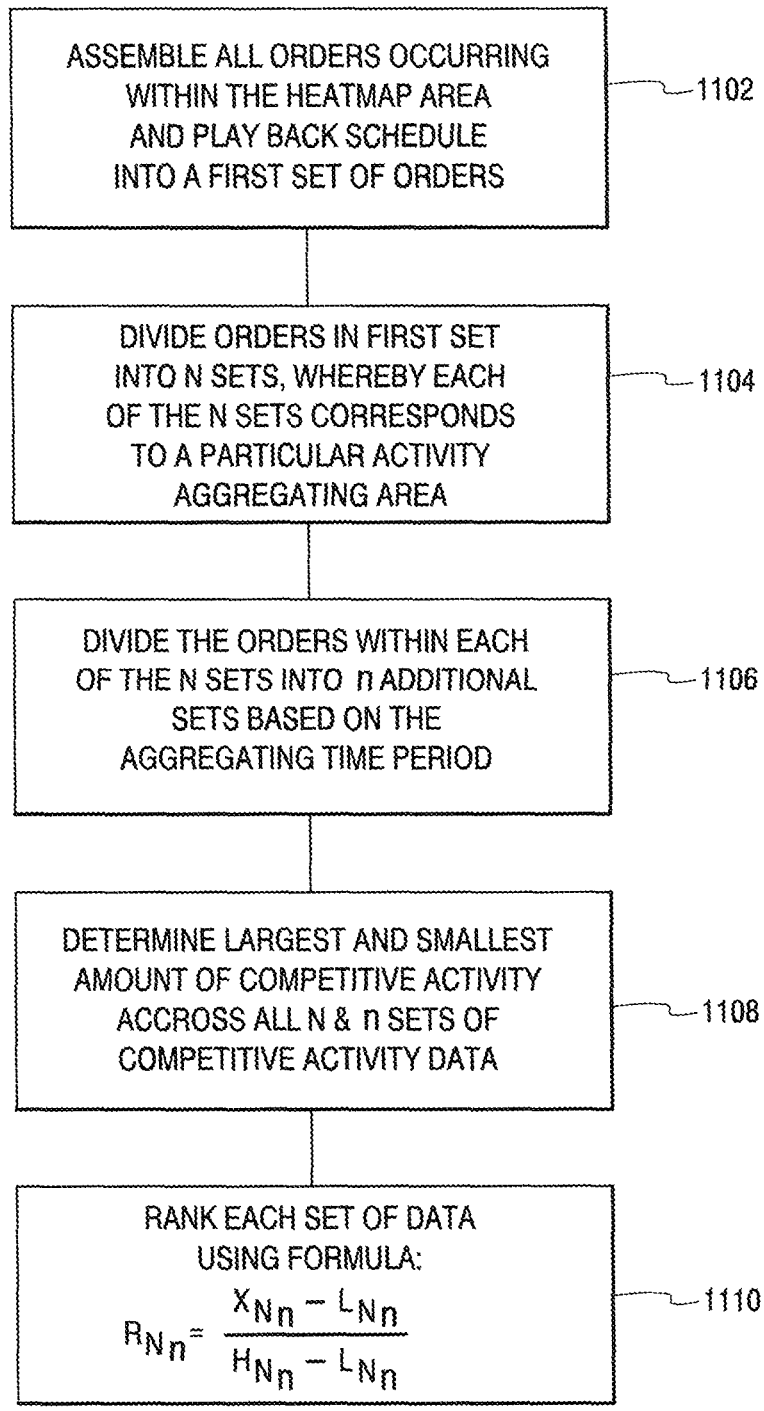
FIG. 22 is a flowchart illustrating a process by which relative rankings of aggregated competitive activity generated in accordance with a playback schedule can be ranked.

FIG. 22 illustrates a process by which the N×n sets of competitive activity that are displayed during the playback of an aggregated heatmap can be ranked so that the relative amount of competitive activity can be properly displayed. In step 1102, all orders that occur within the heatmap area and playback schedule are assembled into a first set of orders. In step 1104, the first set of orders is divided into N sets of orders, with each of the N set of orders corresponding to a specific activity aggregating area; i.e., one of the grid sectors shown in FIG. 21a. In step 1106, the orders within each of the N sets is subdivided into n additional sets of orders. Each of the n sets of orders corresponds to a particular aggregating time period within the playback schedule of a particular activity aggregating area, which is hereinafter referred to as an activity set. For example, if the aggregating time period is 5 minutes, and the playback schedule stretches from 11:30 AM to 12:30 PM on Apr. 17, 2012, activity sets for each of the N activity aggregating areas will be generated for 11:30:01 AM to 11:35 AM, 11:35:01 AM to 11:40 AM, etc., with a total of 12 activity sets being generated for each of the N activity aggregating areas.

In step 1108, the largest ($H_{Nn}$) and smallest ($L_{Nn}$) activity set within the playback schedule is determined. In step 1110 each of the N×n activity sets are scored. One way of scoring the activity sets is through use of the following formula:

$$S_{Nn} = \frac{X_{Nn} - L_{Nn}}{H_{Nn} - L_{Nn}}$$

Where S is the score of the activity set corresponding to activity set indicia X; X is an indicia of the amount of competitive activity for a particular quantum of aggregated competitive activity, H is the highest indicia of competitive activity for all activity sets of aggregated competitive activity within the N×n sets of orders created by the process of FIG. 22, and L is the lowest indicia of competitive activity for all activity sets of aggregated competitive activity within the N×n sets of orders created by the process of FIG. 22.

The above process can be made more useful by discarding all activity sets that have no competitive activity within them, which will allow for more meaningful comparisons of competitive activity. An additional optimization would be to discard all aggregating areas with no competitive activity prior to separating out the aggregating time periods within each aggregating area.

Figure 23:
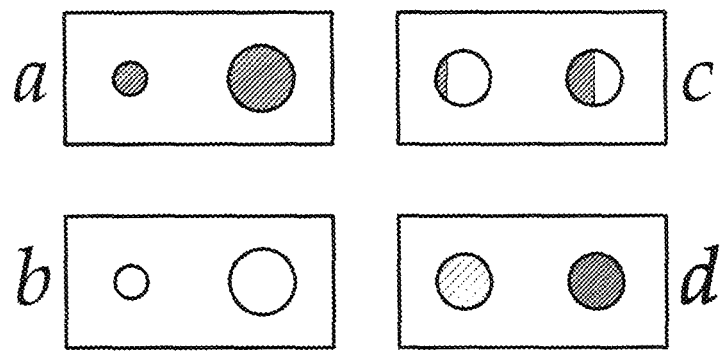
FIGS. 23a-d are illustrations of various ways to display relative amounts of aggregated competitive activity.

By using a ranking method, such as that set forth in FIG. 22, the competitive activity of each activity set can be displayed so that its relative amount of competitive activity is immediately apparent. For example, higher amounts of activity can be marked with darker shades of red, while smaller amounts of competitive activity can be marked with lighter shades of red, orange, yellow, or gray, where little or no activity is present. Alternatively, the size of a marking, such as a circle, can be changed based on the amount of the activity, or the fill of the marking can be changed, so that a low level of activity is denoted by an almost empty marking while a high level of activity is denoted by a nearly full marking. Examples of some of these are shown in FIG. 23.

As discussed above, different indicia may be used to define competitive activity. For example, the number of orders within an activity set can be used as an effective indicia of competitive activity. Alternatively, the dollar amount of orders may be used. Other indicia are also possible, such as an additive or multiplicative combination of order number and dollar amount, an indicia involving item count, or any other indicia that is proportional to business activity for a restaurant.

As discussed above when discussing the generation of non-aggregated heatmaps, aggregated heatmaps of specific items can also be generated.

Figure 24:
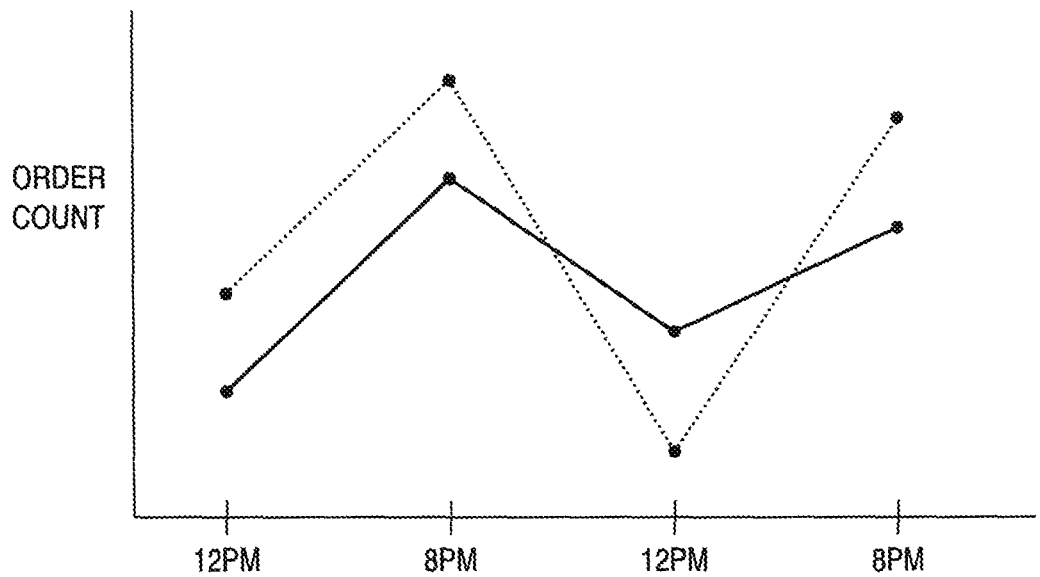
FIG. 24 is a line graph illustration of order activity for the subject restaurant over a time period.

In addition to displaying activity as a heatmap, the disclosed competitive advantage utility also can display competitive activity and subject restaurant activity as a more traditional graph. For example, FIG. 24 illustrates a line graph that displays a restaurant's orders for two consecutive weekends. The lunch period for both days is aggregated into a single point labeled 12 PM and the dinner period for both days is aggregated into a single point labeled 8 PM. Similar graphs can be made for particular items of the subject restaurant, all activity of a group of competitor restaurants, all activity of all competitor restaurants, or specific items of a group of or all competitor restaurants.

Obviously, many additional modifications and variations of the present invention are possible in light of the above teachings. Thus, it is to be understood that, within the scope of the appended claims, the invention may be practiced otherwise than is specifically described above.

The foregoing description of the invention has been presented for purposes of illustration and description, and is not intended to be exhaustive or to limit the invention to the precise form disclosed. The description was selected to best explain the principles of the invention and practical application of these principles to enable others skilled in the art to best utilize the invention in various embodiments and various modifications as are suited to the particular use contemplated. It is intended that the scope of the invention not be limited by the specification, but be defined by the claims set forth below.

What is claimed is:

1. A system for displaying a map of competitive activity pertinent to a subject restaurant, the system comprising:
   i. a database adapted to maintain an order queue;
   ii. a restaurant server having access to the database;
   iii. a computer system coupled to the restaurant server over a network;
   iv. wherein the computer system is adapted to transmit an identifier to the restaurant server, the identifier identifying the subject restaurant to the restaurant server;
   v. wherein the computer system is adapted to transmit an indicia indicative of desired competitor characteristics to the restaurant server;
   vi. wherein the restaurant server is adapted to receive the identifier and the indicia indicative of desired competitor characteristics, and wherein the restaurant server is adapted to query the database for competitors of the subject restaurant based on the indicia of desired competitor characteristics and the identifier;
   vii. wherein the restaurant server is adapted to compile a list of competitors of the subject restaurant and transmit the list of competitors to the computer system;
   viii. wherein the computer system receives the list of competitors, the computer system specifying an indicia indicative of a map area including the subject restaurant and transmitting the indicia indicative of a map area to the restaurant server;
   ix. wherein the restaurant server receives the specified indicia indicative of a map area, the restaurant server being adapted to query the database for competitor activity within the specified map area, the restaurant server being adapted to receive at least one competitive activity event from the database;
   x. wherein the restaurant server is adapted to transmit the at least one competitive activity event to the computer system;
   xi. wherein the computer system is adapted to render the at least one competitive activity event on a display;
   xii. wherein the computer system is further adapted to transmit at least one distance defining an aggregating area, at least one time period defining an aggregating time period, and a playback schedule, and wherein the at least one competitive activity event is a plurality of activity events and wherein the restaurant server is adapted to organize the plurality of competitive activity events into a plurality of activity sets based on the aggregating area and the aggregating time period;
   xiii. wherein the restaurant server is further adapted to generate an aggregate competitive activity indicia for each activity set within the plurality of activity sets; and
   xiv. wherein the restaurant server is adapted to transmit the plurality of aggregate competitive activity indicia to the computer system in accordance with the playback schedule.

2. The system of claim 1 wherein the playback schedule is a single continuous time period.

3. The system of claim 1 wherein the playback schedule is a series of continuous time periods.

4. The system of claim 1 wherein each of the plurality of activity sets is assigned a relative ranking.

5. The system of claim 4 wherein the relative ranking is assigned using the formula $$S_{Nn} = \frac{X_{Nn} - L_{Nn}}{H_{Nn} - L_{Nn}}.$$

6. A method for displaying a map of competitive activity pertinent to a subject restaurant, the method operating on a system comprised of a restaurant server having access to a database and a computer system networked with the restaurant server, the method comprising the steps of:
   i) maintaining an order queue in the database;
   ii) transmitting an identifier from the computer system to the restaurant server, the identifier identifying the subject restaurant;
   iii) transmitting an indicia indicative of desired competitor characteristics from the computer system to the restaurant server;
   iv) the restaurant server querying the database for competitors of the subject restaurant based on the indicia of desired competitor characteristics and the identifier;
   v) the restaurant server compiling a list of competitors of the subject restaurant;
   vi) the restaurant server transmitting the list of competitors to the computer system;
   vii) the computer system receiving the list of competitors;
   viii) the computer system specifying an indicia indicative of a map area including the subject restaurant;
   ix) the computer system transmitting the indicia indicative of a map area to the restaurant server;
   x) the restaurant server receiving the indicia indicative of a map area;
   xi) the restaurant server querying the database for competitor activity within the specified map area;
   xii) the restaurant server receiving at least one competitive activity event from the database;
   xiii) the restaurant server transmitting the competitive activity event to the computer system;
   xiv) the computer system rendering the competitive event on a display;
   xvi) the computer system transmitting to the restaurant server a distance defining an aggregating area, a time period defining an aggregating time period, and a playback schedule;
   xvii) the restaurant server receiving the distance defining an aggregating area, the time period defining an aggregating time period, and the playback schedule;
   xviii) wherein the at least one competitive activity event is a plurality of activity events;
   xix) the restaurant server organizing the plurality of competitive activity events into a plurality of activity sets based on the aggregating area and the aggregating time period;
   xx) the restaurant server generating an aggregate competitive activity indicia for each activity set within the plurality of activity sets; and
   xxi) the restaurant server transmitting the plurality of aggregate competitive activity indicia to the computer system in accordance with the playback schedule.

7. The method of claim 6 wherein the playback schedule is a single continuous time period.

8. The method of claim 6 wherein the playback schedule is a plurality of continuous time periods.

9. The method of claim 6 wherein each of the plurality of activity sets is assigned a relative ranking.

10. The method of claim 9 wherein the relative ranking is assigned using the formula $$S_{Nn} = \frac{X_{Nn} - L_{Nn}}{H_{Nn} - L_{Nn}}.$$

* * * * *